US012771043B2

(12) United States Patent
Singh et al.

(10) Patent No.: US 12,771,043 B2
(45) Date of Patent: Oct. 20, 2026

(54) SYSTEM AND METHOD FOR REDUCING OUT-OF-BAND INTERFERENCE USING A SLICED STATIC METASURFACE WITH A BUILT-IN HARMONIC ABSORBER

(71) Applicant: Dell Products LP, Round Rock, TX (US)

(72) Inventors: Tejinder Singh, Manotick (CA); Harpreet S. Narula, Austin, TX (US); Navjot Kaur Khaira, Manotick (CA)

(73) Assignee: DELL PRODUCTS LP, Round Rock, TX (US)

( * ) Notice: Subject to any disclaimer, the term of this patent is extended or adjusted under 35 U.S.C. 154(b) by 2 days.

(21) Appl. No.: 19/097,041

(22) Filed: Apr. 1, 2025

(65) Prior Publication Data

US 2026/0302641 A1 Oct. 1, 2026

(51) Int. Cl.
*H01Q 15/00* (2006.01)
*H01Q 17/00* (2006.01)

(52) U.S. Cl.
CPC ....... *H01Q 17/001* (2013.01); *H01Q 15/0086* (2013.01)

(58) Field of Classification Search
CPC ......................... H01Q 15/0086; H01Q 17/001
See application file for complete search history.

(56) References Cited

U.S. PATENT DOCUMENTS

| | | | |
|---|---|---|---|
| 12,192,043 | B2 | 1/2025 | Hemadeh |
| 2016/0204515 | A1 | 7/2016 | Smith |
| 2019/0044246 | A1 | 2/2019 | Pitsillides |
| 2020/0025619 | A1 | 1/2020 | Almasri |
| 2020/0227632 | A1 | 7/2020 | Kim |
| 2021/0028547 | A1 | 1/2021 | Falk |
| 2021/0048693 | A1 | 2/2021 | Falk |
| 2021/0050515 | A1 | 2/2021 | Falk |

(Continued)

FOREIGN PATENT DOCUMENTS

| | | | | |
|---|---|---|---|---|
| CN | 114914707 A * | 8/2022 | | H01Q 15/242 |
| JP | 7307825 B2 | 7/2023 | | |

(Continued)

*Primary Examiner* — Daniel Munoz

(74) *Attorney, Agent, or Firm* — Prol Intellectual Property Law, PLLC; H. Kenneth Prol

(57) ABSTRACT

A system and method for reducing harmonic interference from static metasurface unit cell arrays extending radiofrequency signal in a radiofrequency environment includes a plurality of static metasurface unit cell arrays operatively coupled to surface of information handling systems in the radiofrequency environment. The static metasurface unit cell array includes a plurality of subsections of metasurface unit cells of the static metasurface unit cell array to redirect incoming electromagnetic (EM) signals in a plurality of directional lobes, and a plurality of second order harmonics metasurface unit cell absorber subsections to absorb second order harmonic EM signals and a plurality of third order harmonics metasurface unit cell absorber subsections formed proximate to the plurality of redirecting subsections of metasurface unit cells of the static metasurface unit cell array to absorb second and third order harmonic EM signals formed from redirection of EM signals in the plurality of directional lobes.

20 Claims, 13 Drawing Sheets

(56) References Cited

U.S. PATENT DOCUMENTS

| | | | |
|---|---|---|---|
| 2021/0336345 | A1 | 10/2021 | Falk |
| 2023/0027067 | A1 | 1/2023 | Liu |
| 2023/0047663 | A1 | 2/2023 | Wang |
| 2023/0094688 | A1 | 3/2023 | Lai |
| 2023/0408677 | A1 | 12/2023 | Duan |
| 2024/0097744 | A1 | 3/2024 | Bhamri |
| 2024/0337722 | A1 | 10/2024 | Shrivastava |

FOREIGN PATENT DOCUMENTS

| | | | | |
|---|---|---|---|---|
| WO | 2015/094448 | A2 | 6/2015 | |
| WO | 2020/136026 | A1 | 7/2020 | |
| WO | WO-2022094686 | A1 * | 5/2022 | ............. H01Q 9/045 |
| WO | 2023/152856 | A1 | 8/2023 | |
| WO | WO-2023168555 | A1 * | 9/2023 | ............. G06F 30/20 |
| WO | 2023/220319 | A1 | 11/2023 | |
| WO | 2024/171093 | A1 | 8/2024 | |
| WO | 2024/182953 | A1 | 9/2024 | |

* cited by examiner

SYSTEM AND METHOD FOR REDUCING OUT-OF-BAND INTERFERENCE USING A SLICED STATIC METASURFACE WITH A BUILT-IN HARMONIC ABSORBER

FIELD OF THE DISCLOSURE

The present disclosure generally relates to enhancing wireless coverage systems at an information handling system. More specifically, the present disclosure relates to a metasurface unit cell array at an information handling system, such as a laptop, which employs phase cancellation techniques and adaptive attenuation amongst metasurface unit cells to enhance wireless coverage using a multi-slice static metasurface while, with a built-in harmonic absorber, enabling out-of-band harmonics reduction in an incoming electromagnetic (EM) signal or wave.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may be used to execute instructions of a software applications via one or more processing units and provide wireless or wired communications in embodiments herein.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
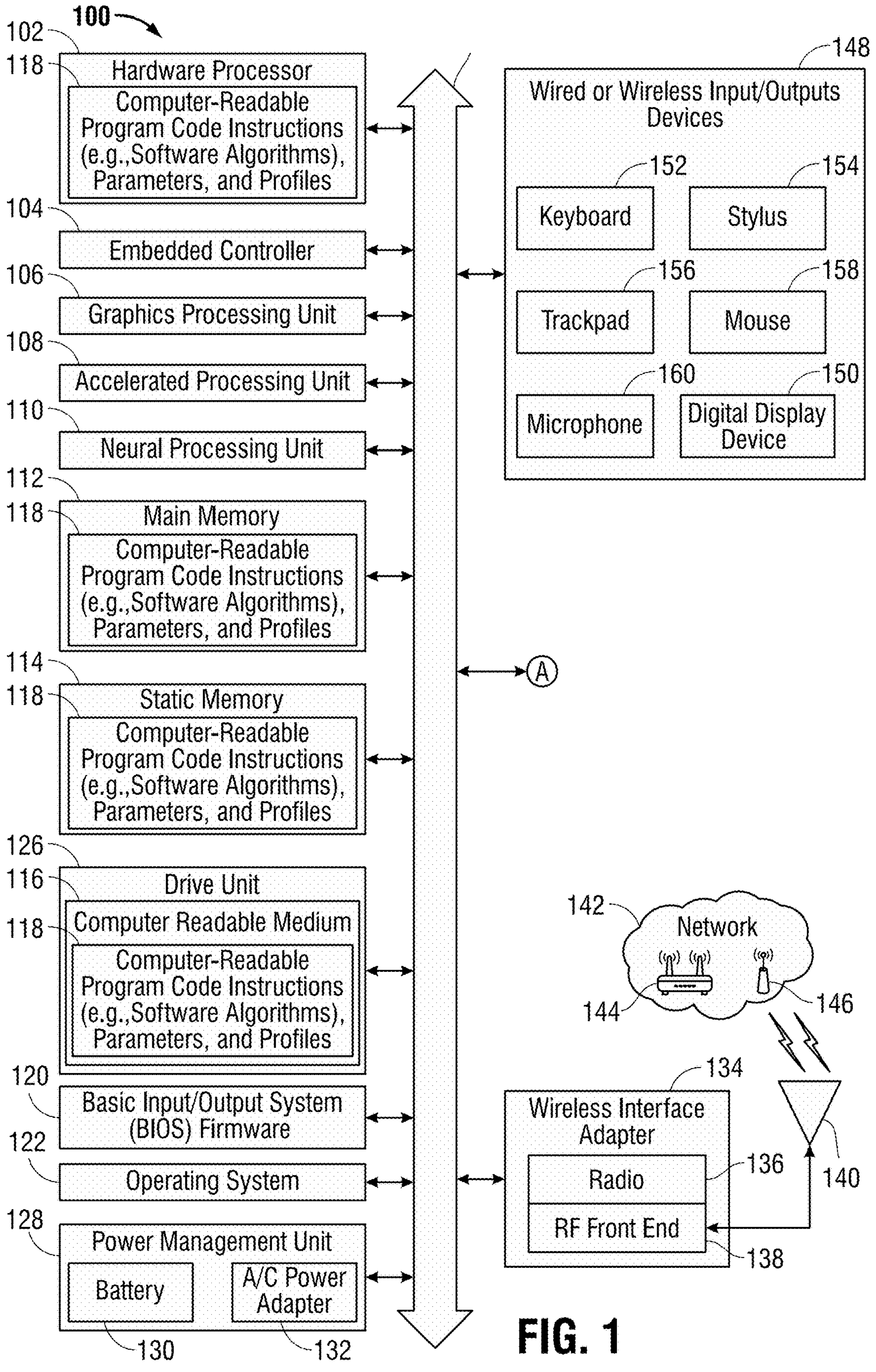
FIG. 1 is a block diagram illustrating an information handling system and a static metasurface unit cell array comprising a plurality of static metasurface unit cells operatively coupled to a surface of the information handling system according to an embodiment of the present disclosure.
Figure 1:
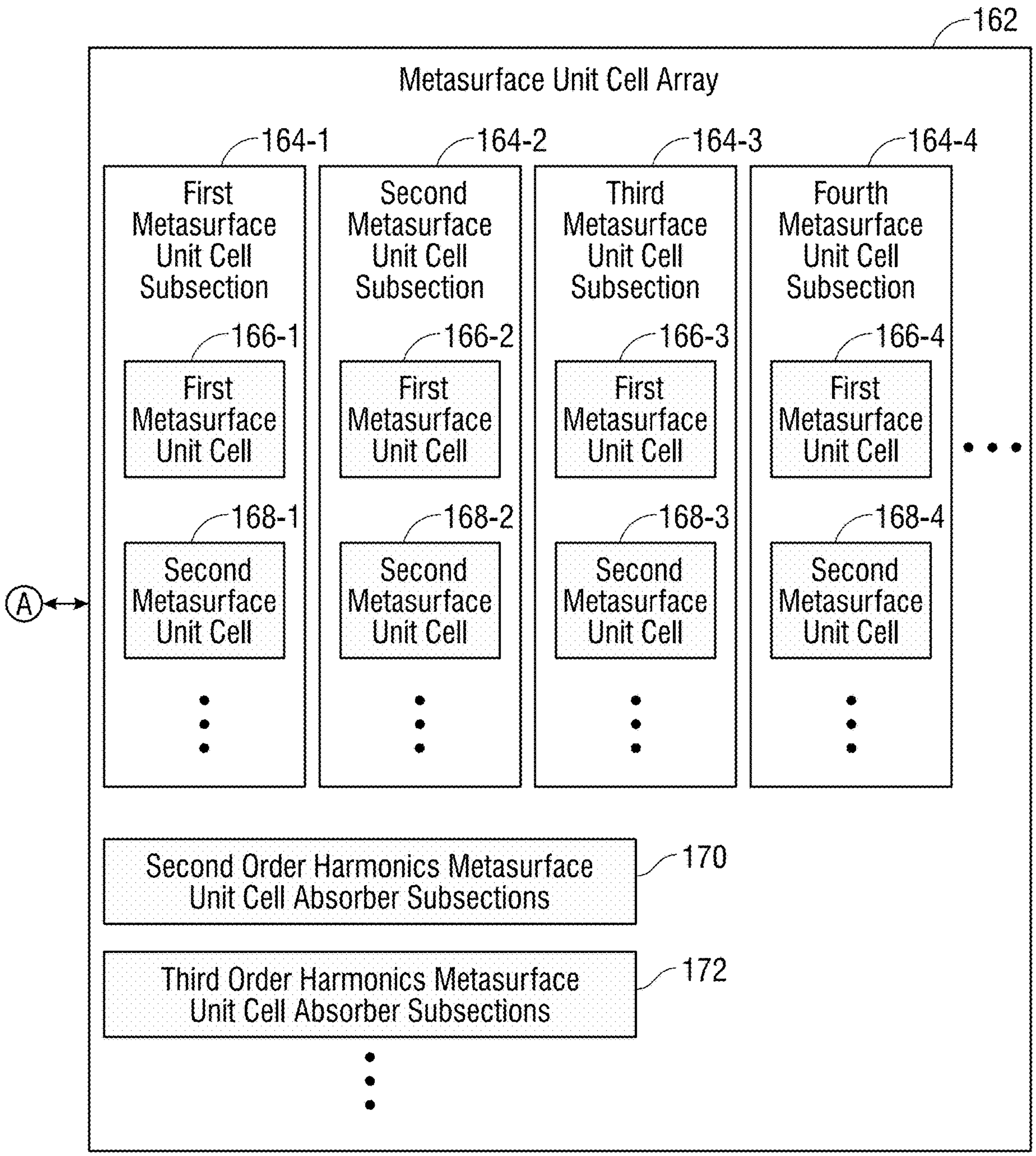

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Wireless data transmission from a transmitting device to a receiving device allows for rapid data transmission and communication between multiple devices. Devices may include wirelessly enabled information handling systems, access point devices, or any computing device, such as internet of things (IoT) devices that are wirelessly capable. As data transmission requirements increase, the electromagnetic (EM) wave (e.g., 5G technologies using 20 to 50 GHz wireless signals or other frequencies, or WiFi 6 signals at 2.4 GHz, 5 GHz or even 6 GHz) used to transmit these ever-increasing amounts of data are shortened and may benefit from extended range. Extending wireless transmission range is especially difficult in areas where dense wireless communications occur such as locations where large numbers of users of information handling systems congregate such as in cafes or libraries. Adding to these wireless communication issues, laptop-type information handling systems, for example, have designs that inadvertently reflect, absorb, or scatter those wireless electromagnetic (EM) waves leading to additional wireless communication issues.

In an attempt to alleviate these wireless communication issues, some wireless communication technologists may install an additional number of routers, switches, or modems that extend the distance of wireless communication throughout an area. However, this increases the costs associated with creating a wireless communication network due to the increased number and complexity of hardware components. Therefore, there is a need to optimize wireless communications within a wireless network with each laptop-type information handling system interacting with those EM waves from an access point such that their interaction may optimize their own wireless performance and coexist seamlessly in a wireless-rich environment.

Nonlinearities in radio frequency (RF) components and environmental factors can introduce second- and third-order harmonics into a wireless signal. These second- and third-order harmonics may interfere with the reception of wireless signals at a laptop computer or an access point (AP), for example. According to embodiments of the present disclosure, one or more metasurface unit cell array having individual metasurface unit cell subsections are used to redirect incoming electromagnetic waves at a plurality of angles to extend range and wireless capabilities within a radiofrequency environment. Second- and third-order harmonics of the EM waves may arise as EM waves are being reflected off of the surface of the each of these one or more metasurface unit cell arrays as between their subsections of individual unit cells. This second- and third-order harmonic interference may reduce the effectiveness of these metasurface unit cell arrays in reflecting EM waves for wireless communications in some embodiments. In an embodiment, EM waves are reflected off of the surface of the metasurface unit cell array from a plurality of metasurface unit cell subsections, for example. These reflections may be directed towards one or more similar directions such that interference between these reflected EM waves may create these second- and third-order harmonics or intermodulation of the reflected EM waves. When these harmonics and intermodulation products overlap with Wi-Fi or 5G bands, they create unwanted noise, reducing the laptop's ability to cleanly receive signals from an access point via these metasurface unit cell arrays, leading to poor connectivity, increased packet loss, and reduced data rates. According to embodiments herein, second- and third-order harmonics wireless signal absorbers minimizing these effects are incorporated into the static metasurface unit cell arrays between metasurface unit cell subsections for effective mitigation ensuring reliable wireless performance in a radiofrequency environment.

The present specification, therefore, describes an information handling system that includes a static metasurface unit cell array operatively coupled to the surface of the information handling system. This surface may include a lid of a laptop onto which the static metasurface unit cell array may be coupled to. This allows the static metasurface unit cell array to interact with those EM waves from, for example, an access point in a radiofrequency environment when the user has opened the lid of the laptop. In an embodiment, the static metasurface unit cell array comprises a plurality of subsets of metasurface unit cells in subsections of the static metasurface unit cell array to redirect incoming electromagnetic (EM) signals in a plurality of directions. The static metasurface unit cell array also includes a plurality of second order harmonics metasurface unit cell absorber subsections to absorb second order harmonic EM signals from the metasurface unit cell subsections reflecting in a plurality of directions in an embodiment. Still further, in an embodiment, the static metasurface unit cell array includes a plurality of third order harmonics metasurface unit cell absorber subsections to absorb third order harmonic EM signals from the metasurface unit cell subsections reflecting in a plurality of directions in another embodiment.

In an embodiment, the static metasurface unit cell array also includes a first subset and a second subset of the metasurface unit cells of the plurality of subsets of metasurface unit cells to redirect the incoming EM signals between −120° to −60° along a horizontal azimuth but in differing vertical direction in one example. In another embodiment, a third subset and a fourth subset of the metasurface unit cells of the plurality of subsets of metasurface unit cells to redirect the incoming EM signals between −60° to 0° along the horizontal azimuth but in differing vertical directions. Additionally, a fifth and sixth subset of the metasurface unit cells of the plurality of subsets of metasurface unit cells to redirect the incoming EM signals between 0° to 60° along the horizontal azimuth but in differing vertical directions in another embodiment. Further, seventh and eighth subset of the metasurface unit cells of the plurality of subsets of metasurface unit cells to redirect the incoming EM signals between 60° to 120° along the horizontal azimuth but in differing vertical directions according to another embodiment. The separation of some of the metasurface unit cells into these subsets of unit cell subsections allows the static metasurface unit cell array to beamform a redirected wireless signal towards plural various directions with horizontal as well as vertical directionality in order to increase the wireless coverage within a given radiofrequency environment of plural information handling systems, access points, and the like.

In embodiments of the present disclosure, the static metasurface unit cell arrays include the plurality of second order harmonics metasurface unit cell absorber subsections to absorb second order harmonic EM noise that may interfere with reflected EM signals. In additional embodiments, the static metasurface unit cell arrays include the plurality of third order harmonics metasurface unit cell absorber subsections to absorb third order harmonic EM noise that may interfere with reflected EM signals. The second or third order harmonics metasurface unit cell absorber subsections integrated with the static metasurface unit cell arrays create a dual-function metasurface for signal enhancement and intermodulation reduction as well as effective reflection of EM signals in the radiofrequency environment for enhanced coverage. By having both EM wave reflective and absorptive elements within the static metasurface unit cell array, those second- and third-order harmonics of the EM waves are reduced while the serviceable area in the radiofrequency environment that the wireless signals reach may be increased. Also, because the static metasurface unit cell array does not require a power supply to operate, the cost of operation is reduced as is the bill of materials used to form the static metasurface unit cell array.

Thus, the presently-described metasurface unit cell array of embodiments herein provides directional signal enhancement by redirecting enhanced EM waves in a plurality of directions with varying vertical or horizontal components without the need for additional active electronic components or complex software algorithms. Still further, the static metasurface unit cell array may be a low-cost and maintenance free solution that makes the static metasurface unit cell array ideal for widespread deployment within a radiofrequency environment. This static metasurface unit cell array may be easily integrated into existing laptop designs without significant cost or complexity thereby providing a long-term enhancement to wireless connectivity without the need for updates or active management. Still further, the static metasurface unit cell array offers enhanced coexistence with passive collaboration among the information handling systems so that signal strength is enhanced and network reliability for each information handling system within the radiofrequency environment can leverage the presence of multiple laptops in order to enhance the network coverage.

Turning now to the figures, FIG. 1 illustrates an information handling system 100 similar to the information handling systems according to several aspects of the present disclosure that may operate as a source or target radiofrequency device for use with the reconfigurable metasurfaces of the embodiments of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 144, a base station transceiver 146, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a client computer in a server-client network environment, or as a peer computer system within a peer-to-peer (or distributed) network environment. In an embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or plural sets, of instructions to perform one or more computer functions.

The information handling system 100 may include main memory 112, (volatile (e.g., random-access memory, etc.), or static memory 114, nonvolatile (read-only memory, flash memory etc.) or any combination thereof), one or more hardware processing resources, such as a hardware processor 102 that may be a central processing unit (CPU), embedded controller (EC) 104, a graphics processing unit (GPU) 106, a neural processing unit (NPU) 110, an accelerated processing unit (APU) 108, other types of hardware processing devices, or any combination thereof. It is appreciated that the information handling system 100 may include any number of hardware processing devices described herein. Computer readable code instructions stored in main memory 112 (e.g., RAM) may be accessible by hardware processing resources using that main memory 112. Computer-readable program code instructions stored in static memory 114, main memory 112, or drive unit 126 may be involved in invoking such computer-readable program code instructions to main memory 112 according to embodiments herein. Additional components of the information handling system 100 may include one or more storage devices such as static memory 114 or drive unit 126. The information handling system 100 may include or interface with one or more communications ports for communicating with external devices, as well as various wired or wireless input and output (I/O) devices 148, such as a mouse 158, a trackpad 156, a stylus 154, a keyboard 152, a digital display device 150, a microphone 160, or any combination thereof. Portions of an information handling system 100 may themselves be considered information handling systems 100.

Information handling system 100 may include devices or modules that embody one or more of the devices or execute instructions for one or more systems and modules. The information handling system 100 may execute computer-readable program code instructions (e.g., software algorithms) parameters, and profiles 118 that may operate on servers or systems, remote data centers, or on-box in individual client information handling systems according to various embodiments herein. In some embodiments, it is understood any or all portions of computer-readable program code instructions (e.g., software algorithms) parameters, and profiles 118 may operate on a plurality of information handling systems 100.

The information handling system 100 may include the hardware processor 102 such as a central processing unit (CPU) or other hardware processing resource (e.g., 104, 106, 108, 110). Any of the hardware processing resources may operate to execute computer readable code instructions that are either firmware or software code, such as those software systems and modules described herein. Moreover, the information handling system 100 may include memory such as main memory 112, static memory 114, and disk drive unit 126 (volatile (e.g., random-access memory, etc.), nonvolatile memory (read-only memory, flash memory etc.) or any combination thereof or other memory with computer readable medium 116 storing computer-readable program code instructions (e.g., software algorithms) parameters, and profiles 118 executable by the hardware processor 102 (e.g., central processing unit), NPU 110, APU 108, EC 104, GPU 106, or any other hardware processing device. The information handling system 100 may also include one or more buses 124 operable to transmit communications between the various hardware components such as any combination of various wired or wireless I/O devices 148 as well as between hardware processors 102, an EC 104, the operating system (OS) 122, the basic input/output system (BIOS) 120, the wireless interface adapter 134, or a radio module, among other components described herein. In an embodiment, the hardware processor 102, EC 104, GPU 106, NPU 110, APU 108, and/or others may execute one or more bus drivers in order to transmit this data between the information handling system 100 and the wired or wireless input/output devices 148 described herein. In an embodiment, the information handling system 100 may be in wired or wireless communication with the wired or wireless I/O devices 148 such as a keyboard 152, a mouse 158, digital display device 150, stylus 154, trackpad 156, microphone 160, among other peripheral devices.

The information handling system 100 further includes a digital display device 150. The digital display device 150 in an embodiment may function as a liquid crystal display (LCD), an organic light emitting diode (OLED), a flat panel display, or a solid-state display. It is appreciated that the digital display device 150 may be wired or wireless and may be an external digital display device 150 that allows a user to increase the desktop area by extending the desktop in an embodiment. Additionally, as described herein, the information handling system 100 may include or be operatively coupled to a cursor control device (e.g., a trackpad 156, or gesture or touch screen input), a stylus 154, and/or a keyboard 152, among others that allows the user to interface with the information handling system 100 via the digital display device 150. Information handling system 100 may also be operatively coupled to a wired or wireless input/output device 148 or other hardware devices that may include a hardware processing device such as a hardware processor, microcontroller, or other hardware processing resource. Various drivers and hardware control device electronics may be operatively coupled to operate the wired or wireless I/O devices 148 according to the embodiments described herein. The present specification contemplates that the wired or wireless I/O devices 148 may be wired or wireless.

A network interface device of the information handling system 100 may be wired or wireless such as shown with wireless interface adapter 134 that can provide wireless connectivity among plural devices such as with Bluetooth® or to a network 142 such as with a wide area network (WAN), a local area network (LAN), wireless local area network (WLAN), a wireless personal area network (WPAN), a wireless wide area network (WWAN), or other network. In embodiments described herein, the wireless interface device 134 with its radio 136, RF front end 138 and one or more antennas 140 is used to communicate with the wireless peripheral devices, via, for example, a Bluetooth® or Bluetooth® Low Energy (BLE) protocols or any proprietary RF protocol such as those may utilize similar frequency ranges but proprietary modulation and data transmission characteristics. In embodiments, Bluetooth®, BLE, proprietary RF protocol, or other WPAN or WLAN protocols and plural such protocols may be used for communication with and among any wireless peripheral device to be paired or paired with the information handling system 100 or other information handling systems. In the context of the present disclosure the one or more antennas 140 may include one or more WiFi antennas operating at 2.4 GHz, 5 GHz, and/or 6 GHz frequencies, one or more Bluetooth antennas, and one or more 5G new radio (5G-NR) antennas that operate at Frequency Range 1 (FR1) (which includes sub-7 GHz frequency bands and those from 410 MHz to 7125 MHz0 and Frequency Range 2 (FR2) (which includes frequency bands from 24.25 GHz to 71.0 GHz frequency bands).

In other embodiments, the wireless interface device 134 with its radio 136, RF front end 138 and antennas 140 are used to communicate with a WWAN or and WLAN which may each include an AP 144 or base station 146 used to operatively couple the information handling system 100 to a network 142 via the wireless interface adapter 134. In a specific embodiment, the network 142 may include macro-cellular connections via one or more base stations 146 or a wireless AP 144 (e.g., Wi-Fi), or such as through licensed or unlicensed WWAN small cell base stations 146. Connectivity may be via wired or wireless connection. For example, wireless network wireless APs 144 or base stations 146 may be operatively connected to the information handling system 100. Wireless interface adapter 134 may include one or more RF (RF) subsystems (e.g., radio 136) with transmitter/receiver circuitry, modem circuitry, one or more antenna RF (RF) front end 138 circuits, one or more wireless controller circuits, amplifiers, antennas 140 and other circuitry of the radio 136 such as one or more antenna ports used for wireless communications via multiple radio access technologies (RATs). The radio 136 may communicate with one or more wireless technology protocols. The receiver device 178 may be any other device and may include the AP 144, the base station 146, or any other computing device described herein. Additionally, the information handling system 100 and receiver device 178 may be capable of transmitting wireless data using, for example, EM waves that include 5G mm wave lengths such as those included within the 20-50 GHz range or WiFi wavelengths such as 2.4 GHz, 5 GHz, 6 GHz or others to be used with later versions of WiFi.

In an embodiment, the wireless interface adapter 134 may operate in accordance with any wireless data communication standards. To communicate with a wireless local area network and/or the receiver device 178, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, Bluetooth® standards, proprietary RF protocol, or similar wireless standards may be used. Wireless interface adapter 134 may connect to any combination of macro-cellular wireless connections including 2G, 2.5G, 3G, 4G, 5G or the like from one or more service providers. Utilization of RF communication bands according to several example embodiments of the present disclosure may include bands used with the WLAN standards and WWAN carriers which may operate in both licensed and unlicensed spectrums. The wireless interface adapter 134 can represent an add-in card, wireless network interface module that is integrated with a main board of the information handling system 100 or integrated with another wireless network interface capability, or any combination thereof.

In some embodiments, a hardware processing resource executes computer-readable program code instructions of software or firmware to implement one or more of some systems and methods described herein, or dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware devices with related control and data signals that may be communicated between and through the modules, or as portions of an application-specific integrated circuit (ASIC). Accordingly, the present system encompasses a hardware processing resource executing computer-readable program code instructions of software or firmware as well as hardware implementations or any combination.

In accordance with various embodiments of the present disclosure, the methods described herein may be implemented by firmware or software programs executable by a hardware controller or a hardware processor system. Further, in an exemplary, non-limited embodiment, implementations may include distributed hardware processing, component/object distributed hardware processing, and parallel hardware processing. Alternatively, virtual computer system processing may be constructed to implement one or more of the methods or functionalities as described herein.

The present disclosure contemplates a computer-readable medium that includes computer-readable program code instructions, parameters, and profiles 118 or receives and executes computer-readable program code instructions, parameters, and profiles 118 responsive to a propagated signal, so that a hardware device connected to a network 142 may communicate voice, video, or data over the network 142. Further, the computer-readable program code instructions, parameters, and profiles 118 may be transmitted or received over the network 142 via the network interface device or wireless interface adapter 134.

The information handling system 100 may include a set of computer-readable program code instructions, parameters, and profiles 118 that may be executed to cause the computer system to perform any one or more of the methods or computer-based functions disclosed herein. For example, computer-readable program code instructions, parameters, and profiles 118 may be executed by a hardware processor 102, GPU 106, EC 104, APU 108, NPU 110, or any other hardware processing resource and may include software agents, or other aspects or components used to execute the methods and systems described herein. Various software modules comprising application computer-readable program code instructions, parameters, and profiles 118 may be coordinated by an operating system (OS) 122, and/or via an application programming interface (API) include a unified device API described herein. An example OS 122 may include Windows®, Android®, and other OS types. Example APIs may include Win 32, Core Java API, or Android APIs.

In an embodiment, the information handling system 100 may include a disk drive unit 126. The disk drive unit 126 and may include machine-readable program code instructions, parameters, and profiles 118 in which one or more sets of machine-readable program code instructions, parameters, and profiles 118 such as firmware or software can be embedded to be executed by the hardware processor 102 (e.g., CPU) or other hardware processing devices such as a GPU 106, an EC 104, an NPU 110, an APU 108, or other hardware processing resource device to perform the processes described herein. Similarly, main memory 112 and static memory 114 may also contain a computer-readable medium for storage of one or more sets of machine-readable program code instructions, parameters, or profiles 118 described herein. The disk drive unit 126 or static memory 114 also contain space for data storage. Further, the machine-readable program code instructions, parameters, and profiles 118 may embody one or more of the methods as described herein. In a particular embodiment, the machine-readable program code instructions, parameters, and profiles 118 may reside completely, or at least partially, within the main memory 112, the static memory 114, and/or within the disk drive 126 during execution by the hardware processor 102, EC 104, APU 108, NPU 100, or GPU 106 of information handling system 100.

Main memory 112 or other memory of the embodiments described herein may contain computer-readable medium (not shown), such as RAM in an example embodiment. An example of main memory 112 includes random access memory (RAM) such as static RAM (SRAM), dynamic RAM (DRAM), non-volatile RAM (NV-RAM), or the like, read only memory (ROM), another type of memory, or a combination thereof. Static memory 114 may contain computer-readable medium (not shown), such as NOR or NAND flash memory in some example embodiments. The applications and associated APIs, for example, may be stored in static memory 114 or on the disk drive unit 126 that may include access to a machine-readable code instructions, parameters, and profiles 118 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 128 (a.k.a. a power supply unit (PSU)). The PMU 128 may include a hardware controller and executable machine-readable code instructions to manage the power provided to the components of the information handling system 100 such as the hardware processor 102 and other hardware components described herein. The PMU 128 may control power to one or more components including the one or more drive units 126, the hardware processor 102 (e.g., CPU), the EC 104, the GPU 106, the APU 108, the NPU 110, the video/graphic display device 150, or other wired or wireless I/O devices 148 such as the mouse 158, the stylus 154, the keyboard 152, and the trackpad 156 and other components that may require power when a power button has been actuated by a user. In an embodiment, the PMU 128 may monitor power levels and be electrically coupled to the information handling system 100 in embodiments herein to provide this power. The PMU 128 may be coupled to the bus 124 to provide or receive data or machine-readable code instructions. The PMU 128 may regulate power from a power source such as the battery 130, or AC power adapter 132. In an embodiment, the battery 130 may be charged via the AC power adapter 132 and provide power to the components of the information handling system 100, via wired connections, or when AC power from the AC power adapter 132 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 116 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

As described herein, the information handling system 100 may include a metasurface unit cell array 162. In an embodiment, the metasurface unit cell array 162 is a static metasurface unit cell array 162 that does not require power to operate as described herein. In an embodiment, the metasurface unit cell array 162 may be affixed to, formed onto, or embedded in a display chassis cover of the laptop-type information handling system 100 such as the A-cover of a laptop type information handling system or the back of a tablet type information handling system. The A-cover may include a top portion of the lid of the laptop-type information handling system 100 housing an integrated digital display device 150, for example. The placement of the metasurface unit cell array 162 on the A-cover of the laptop-type information handling system 100 or the back of a tablet-type information handling system 100 may allow for the enhancement of wireless coverage within an area of a radiofrequency environment. As described herein, the metasurface unit cell array 162 may be used to redirect incoming electromagnetic (EM) waves with enhancements of those signals on one or more of a plurality of directions to extend the wireless coverage of a network device such as an AP 144 or a base station 146. Additionally, as described herein, portions of the metasurface unit cell array 162 may be used to absorb second- and third-order harmonics of one or more of a plurality of frequencies of a wireless signal being reflected by the metasurface unit cell array 162.

In an embodiment, the metasurface unit cell array 162 may be segregated or otherwise divided into a plurality of metasurface unit cell subsections 164-1, 164-2, 164-3, 164-4. Any number of metasurface unit cell subsections may be used in embodiments herein. As shown in the example embodiment of FIG. 1, the metasurface unit cell array 162 may be divided into four metasurface unit cell subsections that includes a first metasurface unit cell subsection 164-1, a second metasurface unit cell subsection 164-2, a third metasurface unit cell subsection 164-3, and a fourth metasurface unit cell subsection 164-4 in one example. It is appreciated that this number of metasurface unit cell subsections shown in FIG. 1 is merely an example and the present specification contemplates that the metasurface unit cell array 162 may be divided into more or fewer than four metasurface unit cell subsections. In embodiments of the present disclosure, the metasurface unit cell array 162 may be divided into plural metasurface unit cell subsections for plural ranges of horizontal directions of reflection and may further include one or more metasurface unit cell subsections having differing vertical directions for each range of horizontal directions of reflection of EM signals.

As shown in FIG. 1, each of the metasurface unit cell subsections 164-1, 164-2, 164-3, 164-4 may include a plurality of metasurface unit cells. FIG. 1 shows, at least, a first metasurface unit cell 166-1, 166-2, 166-3, 166-4 and a second metasurface unit cell 168-1, 168-2, 168-3, 168-4 included in each of the metasurface unit cell subsections 164-1, 164-2, 164-3, 164-4. It is appreciated, however, that each of the metasurface unit cell subsections 164-1, 164-2, 164-3, 164-4 of the metasurface unit cell array 162 may include more than the first metasurface unit cell 166-1, 166-2, 166-3, 166-4 and second metasurface unit cell 168-1, 168-2, 168-3, 168-4 respectively shown in FIG. 1 and instead may include more than those shown.

In one embodiment, the metasurface unit cell array 162 may include each of the metasurface unit cell subsections 164-1, 164-2, 164-3, 164-4 that includes an array of metasurface unit cells arranged in rows and columns. In an embodiment, the metasurface unit cell array 162 may include the first metasurface unit cell subsection 164-1 that includes an array of metasurface unit cells 166-1, 168-1, and others arranged in rows and columns. Similarly in an embodiment, the metasurface unit cell array 162 may include the second metasurface unit cell subsection 164-2 that includes an array of metasurface unit cells 166-2, 168-2, and others arranged in rows and columns. In another embodiment, the metasurface unit cell array 162 may include the third metasurface unit cell subsection 164-3 that includes an array of metasurface unit cells 166-3, 168-3, and others arranged in rows and columns. In a further embodiment, the metasurface unit cell array 162 may include the fourth metasurface unit cell subsection 164-4 that includes an array of metasurface unit cells 166-4, 168-4, and others arranged in rows and columns. It is appreciated, however, that any arrangement and any number of metasurface unit cells 166-1, 166-2, 166-3, 166-4, 168-1, 168-2, 168-3, 168-4 may be used to form the metasurface unit cell array 162 and any number of unit cell subsections described herein. As described herein, the metasurface unit cell array 162 is a static metasurface unit cell array 162 that does not use power to reconfigure any of the metasurface unit cells 166-1, 166-2, 166-3, 166-4, 168-1, 168-2, 168-3, 168-4 such that the formation of the individual metasurface unit cells 166-1, 166-2, 166-3, 166-4, 168-1, 168-2, 168-3, 168-4 within each of the metasurface unit cell subsections 164-1, 164-2, 164-3, 164-4 are selected and arranged to form differences in the redirection phase of the EM wave reflected at each unit cell within the metasurface unit cell subsections 164-1, 164-2, 164-3, 164-4. In this way, the arrangement of unit cells within each metasurface unit cell subsection 164-1, 164-2, 164-3, or 164-4 is used to beamform the redirected EM wave in a specific direction at a specific magnitude. Thus, in an embodiment each of the first metasurface unit cell 166-1, 166-2, 166-3, 166-4, second metasurface unit cell 168-1, 168-2, 168-3, 168-4, and other metasurface unit cells are formed in dimensions of resonating structures and arranged to create a specific phase shifting pattern across the unit cells that redirects incoming EM waves in a direction with a horizontal and vertical component while also increasing the gain of that EM wave using constructive and/or destructive interference principles among the plurality of metasurface unit cells 166-1, 166-2, 166-3, 166-4, 168-1, 168-2, 168-3, 168-4 within each of the metasurface unit cell subsections 164-1, 164-2, 164-3, 164-4.

In an embodiment, the metasurface unit cell subsections 164-1, 164-2, 164-3 and 164-4 may be horizontally or vertically adjacent on the metasurface unit cell array 162. In one example embodiments, metasurface unit cell subsections 164-1 and 164-2 as well as 164-3 and 164-4 are vertically or horizontally adjacent. These adjacently arranged metasurface unit cell subsections 164-1 and 164-2 or 164-3 and 164-4 may be separated from each other by one or more second order harmonics metasurface unit cell absorber subsections 170 and one or more third order harmonics metasurface unit cell absorber subsections 172 to reduce the interference of harmonics or intermodulation of the redirected EM waves in embodiments herein. In a specific embodiment, the metasurface unit cell subsections 164-1, 164-2, 164-3, or 164-4 may be separated from each adjacent neighboring metasurface unit cell subsection 164-1, 164-2, 164-3, or 164-4 by the one or more second order harmonics metasurface unit cell absorber subsections 170 and one or more third order harmonics metasurface unit cell absorber subsections 172 integrated into the metasurface unit cell array 162 of embodiments of the present disclosure. Thus, in an embodiment, the metasurface unit cell array 162 shown in FIG. 1 may be used to redirect a single incoming EM wave in four distinct beam directions, with any horizontal or vertical directionality components, without each of the beams interfering with each other. It is appreciated that in embodiments of the present disclosure, any plurality of metasurface unit cell subsections, such as 164-1, 164-2, 164-3, 164-4, yielding any plurality of distinct beam directions, with any horizontal or vertical directionality components may be formed with metasurface unit cell array 162. In the example embodiment of FIG. 1, four metasurface unit cell subsections 164-1, 164-2, 164-3, 164-4 with four distinct beam directions having any horizontal or vertical directionality components are used for purposes of description. Further, the metasurface unit cell subsections, such as 164-1, 164-2, 164-3, 164-4, may be arranged vertically or horizontally with respect to one another in various embodiments herein within the metasurface unit cell array 162.

In another embodiment, the metasurface unit cell subsections 164-1, 164-2, 164-3, 164-4 may be separated from each other, such as horizontally adjacent subsections, by a distance to reduce the interference of the redirected EM waves. In a specific embodiment, horizontally adjacent metasurface unit cell subsections 164-1, 164-2, 164-3, or 164-4 may be separated from each neighboring metasurface unit cell subsection 164-1, 164-2, 164-3, 164-4 by at least a distance of a dimension similar to one or two metasurface unit cells 166-1, 166-2, 166-3, 166-4, 168-1, 168-2, 168-3, 168-4. Thus, in an embodiment, the metasurface unit cell array 162 shown in FIG. 1 may be used to redirect a single incoming EM wave in four distinct beam directions without each of the beams interfering with each other.

In one specific example embodiment, the four metasurface unit cell subsections 164-1, 164-2, 164-3, 164-4 may redirect the incoming EM wave in a specific direction or directional range. For example, the first metasurface unit cell subsection 164-1 of the static metasurface unit cell array 162 may redirect the incoming EM signals or waves in a first direction or directional range along a horizontal azimuth as well as along a vertical azimuth. On one specific embodiment, the first metasurface unit cell subsection 164-1 may redirect the EM wave between −120° to −60° along the horizontal azimuth. In this specific example embodiment, the second metasurface unit cell subsection 164-2 of the metasurface unit cell array 162 may redirect the EM wave in a second direction along an azimuth such as between −60° to 0° along the horizontal azimuth. Additionally, in this specific example embodiment, the third metasurface unit cell subsection 164-3 of the metasurface unit cell array 162 may redirect incoming EM waves in a third direction along the azimuth such as between 0° to 60° along the horizontal azimuth. Even further, the fourth metasurface unit cell subsection 164-4 of the metasurface unit cell array 162 may redirect incoming EM waves in a fourth direction along the azimuth such as between 60° to 120° along the horizontal azimuth. It is also appreciated that one or more of the metasurface unit cell subsections 164-1, 164-2, 164-3, 164-4 may redirect incoming EM waves along a vertical or elevational component of the directionality of the redirected EM wave may also be incorporated into one or more of the metasurface unit cell subsections 164-1, 164-2, 164-3, 164-4. For example, plural metasurface unit cell subsections 164-1, 164-2, 164-3, 164-4 may redirect EM waves in the same direction range along the horizontal azimuth, but redirect the EM waves in different vertical directions in some embodiments. In such embodiments, the formation of second or third order harmonics or intermodulation of these reflected EM waves is at risk of causing interference. In various embodiments herein, the individual metasurface unit cells 166-1, 166-2, 166-3, 166-4, 168-1, 168-2, 168-3, 168-4 within each of the metasurface unit cell subsections 164-1, 164-2, 164-3, 164-4 can be selected and arranged for phase shift patterns to redirect the incoming EM waves horizontally as well as up or down relative to the surface of the metasurface unit cell array 162. Thus, second- or third-order harmonics may form to interfere with adjacent metasurface unit cell subsections 164-1, 164-2, 164-3, 164-4.

It is appreciated that the metasurface unit cell subsections 164-1, 164-2, 164-3, 164-4 may be configured to redirect a plurality of EM wave frequencies. For example, the first metasurface unit cell subsection 164-1 may include a plurality of first metasurface unit cells 166-1, 166-2, 166-3, 166-4 and second metasurface unit cells 168-1, 168-2, 168-3, 168-4 that are formed to redirect a first frequency of EM waves and a second frequency of EM waves, respectively. This may be done, in an example embodiment, that doubles the number of first metasurface unit cell subsections 164-1, the second metasurface unit cell subsections 164-2, the third metasurface unit cell subsections 164-3, and the fourth metasurface unit cell subsection 164-4 with each of the unit cells within each set of metasurface unit cell subsections 164-1, 164-2, 164-3, 164-4 responsible for redirecting a respective EM wave frequency such as 2.4 GHz and 5 GHz, respectively. This allows a single metasurface unit cell array 162 to redirect two different frequencies of EM waves. In another embodiment, each of the metasurface unit cell subsections 164-1, 164-2, 164-3, 164-4 may include unit cells that include a set of first unit cells configured to redirect a first frequency of EM waves (e.g., 2.4 GHz) as well as a second set of second unit cells configured to redirect a second frequency of EM waves (e.g., 5 GHz).

As described herein, the metasurface unit cell array 162 may include one or more second order harmonics metasurface unit cell absorber subsections 170 and one or more third order harmonics metasurface unit cell absorber subsections 172. During the operation of a wireless network, various nonlinearities in RF components and environmental factors of EM waves reflected by each of the metasurface unit cell subsections 164-1, 164-2, 164-3, 164-4 can introduce second- and third-order harmonics into a wireless signal and/or the wireless environment. These second- and third-order harmonics may interfere with the reception of wireless signals at one or more information handling systems 100 within a radiofrequency environment. The second order harmonics metasurface unit cell absorber subsections 170 and third order harmonics metasurface unit cell absorber subsections 172 mitigate these effects by absorbing these second- and third-order harmonics from between adjacent metasurface unit cell subsections 164-1, 164-2, 164-3, 164-4 thereby improving the quality, reliability, and efficiency of a wireless signal redirected from the metasurface unit cell array 162. In an embodiment, the second order harmonics metasurface unit cell absorber subsections 170 and third order harmonics metasurface unit cell absorber subsections 172 may be configured with plural arrangement of unit cells to absorb different second- and third-order harmonics associated with a plurality of frequencies intended to be reflected by the adjacent metasurface unit cell subsections 164-1, 164-2, 164-3, 164-4. Therefore, by reducing these unwanted second- and third-order harmonics, the redirected wireless signal experiences less spectral pollution, leading to a cleaner redirected EM wave in the radiofrequency environment with minimal interference.

As described herein, the presently-described static metasurface unit cell array 162 of embodiments herein provides directional signal enhancement by redirecting enhanced EM waves in plural directions to extend wireless range of a radiofrequency environment without the need for electronic components or complex software algorithms. Still further, the static metasurface unit cell array 162 may be a low-cost and maintenance free solution that makes the static metasurface unit cell array 162 ideal for widespread deployment. This static metasurface unit cell array 162 may be easily integrated into existing laptop designs without significant cost or complexity thereby providing a long-term enhancement to wireless connectivity without the need for updates or active management. Still further, the static metasurface unit cell array 162 offers enhanced coexistence with passive collaboration among the information handling systems 100 so that signal strength is enhanced and network reliability for each information handling system 100 can leverage the presence of multiple laptops in order to enhance the network coverage.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2:
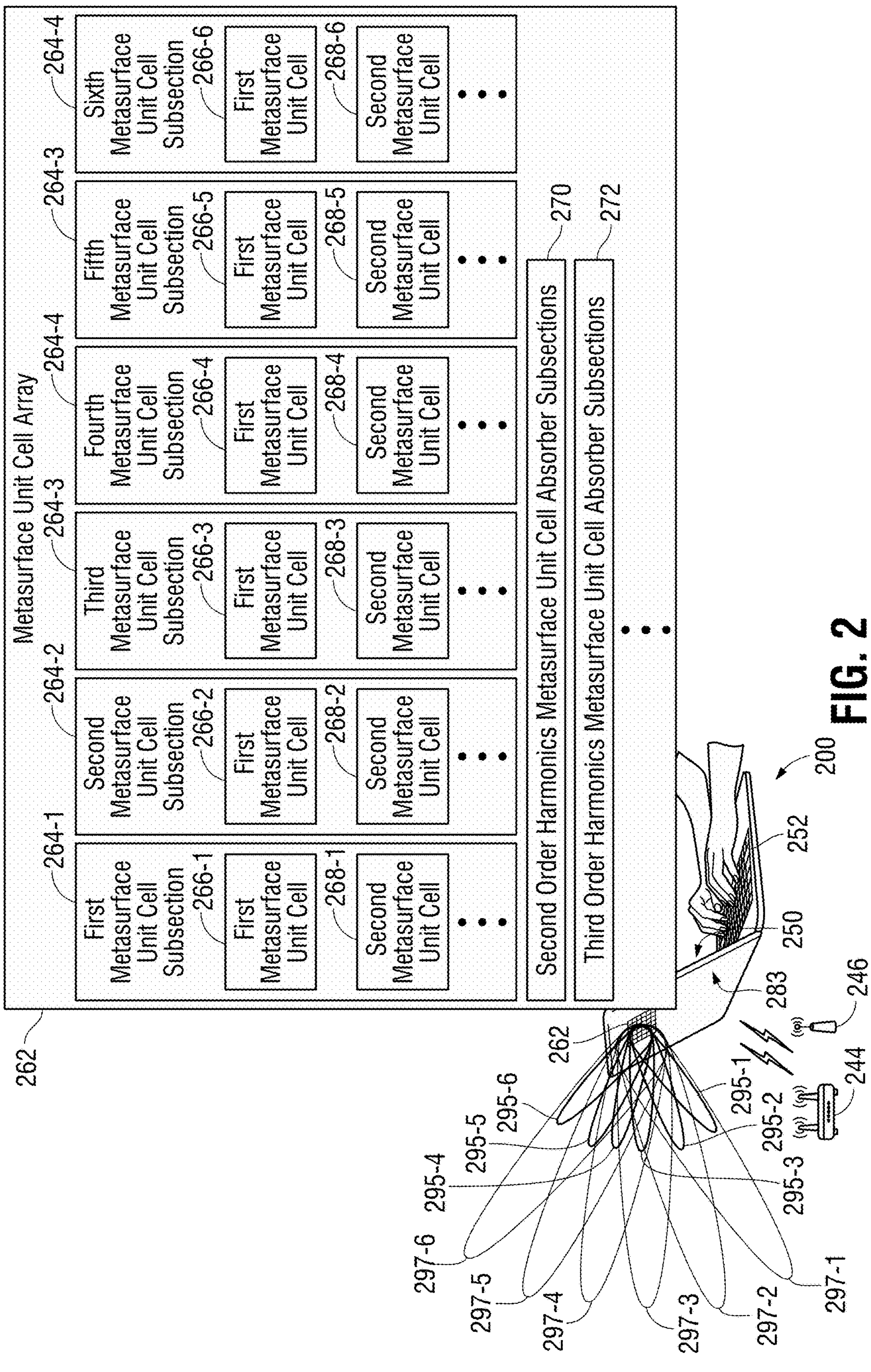
FIG. 2 is a block and graphic diagram illustrating an information handling system with a metasurface unit cell array comprising a plurality of metasurface unit cell subsections including harmonics metasurface unit cell absorber subsections according to an embodiment of the present disclosure.

FIG. 2 is a block and graphic diagram illustrating an information handling system 200 and a metasurface unit cell array 262 comprising a plurality of static metasurface unit cells 266-1, 266-2, 266-3, 266-4, 268-1, 268-2, 268-3, 268-4 separated into six metasurface unit cell subsections 264-1, 264-2, 264-3, 264-4, 264-5, 264-6 and including one or more second order harmonics metasurface unit cell absorber subsections 270 and one or more third order harmonics metasurface unit cell absorber subsections 272 operatively coupled to a surface of the information handling system 200 according to an embodiment of the present disclosure. As described herein, the information handling system 200 may be a laptop-type information handling system 200 that includes a lid portion 283 such as part of a display chassis for housing a digital display device 250. This lid portion 283 may be one location on the surface of the information handling system 200 where the metasurface unit cell array 262 may be placed. In an embodiment, the individual static metasurface unit cells 266-1, 266-2, 266-3, 266-4, 268-1, 268-2, 268-3, 268-4 of the metasurface unit cell array 262 may be formed directly on or embedded into the surface of the lid portion 283. In another embodiment, the metasurface unit cell array 262 may include a substrate onto which the static metasurface unit cells 266-1, 266-2, 266-3, 266-4, 268-1, 268-2, 268-3, 268-4 are placed on and the metasurface unit cell array 262 may be affixed to the surface of the lid portion 283. In yet another example embodiment, the metasurface unit cell array 262 may be formed into a protective case which may be coupled to the lid portion 283. In still another example embodiment, those unit cells of the metasurface unit cell array 262 that form the metasurface unit cell subsections 264-1, 264-2, 264-3, 264-4, 264-5, 264-6 may include a substrate with metal base layer that allows the unit cells to redirect the incoming EM waves while the unit cells that form the second order harmonics metasurface unit cell absorber subsections 270 and third order harmonics metasurface unit cell absorber subsections 272 may not include a substrate with a metal base layer underneath such that those incoming second- and third-order harmonic EM waves are absorbed into the metasurface unit cell array 262.

As shown in FIG. 2, the laptop-type information handling system 200 includes a keyboard 252 for the user to provide input to the information handling system 200. Still further, the information handling system 200 may include a digital display device 250 for the user to be presented with visual output from the information handling system 200.

In an embodiment, the metasurface unit cell array 262 may be segregated or otherwise divided into a plurality of metasurface unit cell subsections 264-1, 264-2, 264-3, 264-4, 264-5, 264-6. In the specific embodiment of FIG. 2, the metasurface unit cell array 262 may be divided into six metasurface unit cell subsections 264-1, 264-2, 264-3, 264-4, 264-5, 264-6 that includes a first metasurface unit cell subsection 264-1, a second metasurface unit cell subsection 264-2, a third metasurface unit cell subsection 264-3, a fourth metasurface unit cell subsection 264-4, a fifth metasurface unit cell subsection 264-5, and a sixth metasurface unit cell subsection 264-6. It is appreciated that this number of metasurface unit cell subsections shown in FIG. 2 is merely an example and the present specification contemplates that the metasurface unit cell array 262 may be divided into more or fewer than six metasurface unit cell subsections as shown.

As shown in FIG. 2, each of the metasurface unit cell subsections 264-1, 264-2, 264-3, 264-4, 264-5, 264-6 may include a plurality of metasurface unit cells. FIG. 2 shows, at least, a first metasurface unit cell 266-1, 266-2, 266-3, 266-4, 266-5, 266-6 and a second metasurface unit cell 268-1, 268-2, 268-3, 268-4, 268-5, 268-6 included in each of the metasurface unit cell subsections 264-1, 264-2, 264-3, 264-4, 264-5, 264-6 respectively. It is appreciated, however, that each of the metasurface unit cell subsections 264-1, 264-2, 264-3, 264-4, 264-5, 264-6 of the metasurface unit cell array 262 may include more than the first metasurface unit cell 266-1, 266-2, 266-3, 266-4, 266-5, 266-6 and s second metasurface unit cell 268-1, 268-2, 268-3, 268-4, 268-5, 268-6 shown in FIG. 2 and instead may include more than those shown. In an embodiment, the metasurface unit cell array 262 may include a first metasurface unit cell subsection 264-1 that includes an array of metasurface unit cells 266-1, 268-1, and others arranged in rows and columns. In an embodiment, the metasurface unit cell array 262 may include a second metasurface unit cell subsection 264-2 that includes an array of metasurface unit cells 266-2, 268-2, and others arranged in rows and columns. In an embodiment, the metasurface unit cell array 262 may include a third metasurface unit cell subsection 264-3 that includes an array of metasurface unit cells 266-3, 268-3, and others arranged in rows and columns. In an embodiment, the metasurface unit cell array 262 may include a fourth metasurface unit cell subsection 264-4 that includes an array of metasurface unit cells 266-4, 268-4, and others arranged in rows and columns. In an embodiment, the metasurface unit cell array 262 may include a fifth metasurface unit cell subsection 264-5 that includes an array of metasurface unit cells 266-5, 268-5, and others arranged in rows and columns. In an embodiment, the metasurface unit cell array 262 may include a sixth metasurface unit cell subsection 264-6 that includes an array of metasurface unit cells 266-6, 268-6, and others arranged in rows and columns. It is appreciated, however, that any arrangement and any number of metasurface unit cells 266-1 through 266-6 and 268-1 through 268-6 may be used to form the metasurface unit cell array 262 described herein.

As described herein, the metasurface unit cell array 262 is a static metasurface unit cell array 262 that does not use power to reconfigure any of the metasurface unit cells 266-1 through 266-6 and 268-1 through 268-6 such that the formation of the individual metasurface unit cells 266-1 through 266-6 and 268-1 through 268-6 within each of the metasurface unit cell subsections 264-1, 264-2, 264-3, 264-4, 264-5, 264-6 are formed to create differences in the redirection phase of the EM wave to beamform the redirected EM wave in a specific direction at a specific magnitude. Thus, in an embodiment each of the first metasurface unit cell 266-1, 266-2, 266-3, 266-4, 266-5, 266-6, second metasurface unit cell 268-1, 268-2, 268-3, 268-4, 268-5, 268-6, and other metasurface unit cells are formed to create a specific phase shifting that redirects incoming EM waves while also increasing the gain of that EM wave using constructive and/or destructive interference principles among the plurality of metasurface unit cells 266-1 through 266-6 and 268-1 through 268-6 within each of the metasurface unit cell subsections 264-1, 264-2, 264-3, 264-4, 264-5, 264-6. Those directions of redirected EM waves may include a horizontal or vertical component as well in various embodiments herein.

It is appreciated that the number of metasurface unit cell subsections 264-1, 264-2, 264-3, 264-4, 264-5, 264-6 may be doubled such that the individual metasurface unit cell subsections 264-1, 264-2, 264-3, 264-4, 264-5, 264-6 are separated into two distinct sets of metasurface unit cell subsections 264-1, 264-2, 264-3, 264-4, 264-5, 264-6. These two distinct sets of metasurface unit cell subsections 264-1, 264-2, 264-3, 264-4, 264-5, 264-6 may be configured to redirect a first frequency of EM waves and a second frequency of EM waves, respectively. This may be done by configuring the individual metasurface unit cells 266-1 through 266-6 and 268-1 through 268-6 present within each of the metasurface unit cell subsections 264-1, 264-2, 264-3, 264-4, 264-5, 264-6 such that two individual frequencies of EM waves may be redirected or reflected off of the surface of the metasurface unit cell array 262.

In one specific example embodiment, the six metasurface unit cell subsections 264-1, 264-2, 264-3, 264-4, 264-5, 264-6 may redirect the incoming EM wave in a specific direction or directional range across a horizontal azimuth. For example, the first metasurface unit cell subsection 264-1 of the static metasurface unit cell array 262 may redirect the incoming EM signals or waves in a first direction or directional range along an azimuth. This creates a first redirected beam 297-1 reflected off of the metasurface unit cell array 262. Specifically, the first redirected beam 297-1 reflected off of the first metasurface unit cell subsection 264-1 may redirect the EM wave between −120° to −80° along the azimuth. In this example embodiment, the second metasurface unit cell subsection 264-2 of the metasurface unit cell array 262 may redirect the EM wave thereby creating a second redirected beam 297-2 in a second direction along an azimuth such as between −80° to −40° along the azimuth. Additionally, in this example embodiment, the third metasurface unit cell subsection 264-3 of the metasurface unit cell array 262 may redirect incoming EM wave thereby creating a third redirected beam 297-3 directed towards a third direction along the azimuth such as between −40° to 0° along the azimuth. Even further, the fourth metasurface unit cell subsection 264-4 of the metasurface unit cell array 262 may redirect incoming EM waves thereby creating a fourth redirected beam 297-4 in a fourth direction along the azimuth such as between 0° to 40° along the azimuth. Still further, the fifth metasurface unit cell subsection 264-5 of the metasurface unit cell array 262 may redirect incoming EM waves thereby creating a fifth redirected beam 297-5 in a fourth direction along the azimuth such as between 40° to 80° along the azimuth. Additionally, the sixth metasurface unit cell subsection 264-6 of the metasurface unit cell array 262 may redirect incoming EM waves thereby creating a sixth redirected beam 297-6 in a fourth direction along the azimuth such as between 80° to 120° along the azimuth. Again, it is also appreciated that a vertical or elevational component of the directionality of the redirected EM wave may also be incorporated into one or more of the metasurface unit cell subsections 264-1, 264-2, 264-3, 264-4, 264-5, 264-6 such that the formation of the individual metasurface unit cells 266-1 through 266-6 and 268-1 through 268-6 within each of the metasurface unit cell subsections 264-1, 264-2, 264-3, 264-4, 264-5, 264-6 can redirect the incoming EM waves up or down relative to the surface of the metasurface unit cell array 262.

As described herein, the metasurface unit cell array 262 includes one or more second order harmonics metasurface unit cell absorber subsections 270. These second order harmonics metasurface unit cell absorber subsections 270 may absorb those second-order harmonics of a first frequency and/or a second frequency that are generated at horizontally or vertically adjacent metasurface unit cell subsections 264-1, 264-2, 264-3, 264-4, 264-5, 264-6 from redirection of those EM waves transmitted from an access point 244 or base station 246, for example. As described herein, the second order harmonics metasurface unit cell absorber subsections 270 may be formed to destructively interfere with and absorb those undesired out-of-band harmonics (e.g., second-order harmonics) and intermodulation products due to adjacent metasurface unit cell subsections 264-1, 264-2, 264-3, 264-4, 264-5, 264-6. Similarly, the third order harmonics metasurface unit cell absorber subsections 272 may also include unit cells that destructively interfere with and absorb those undesired out-of-band harmonics (e.g., third-order harmonics) and intermodulation products within the wireless signal. This creates a metasurface unit cell array 262 with dual functionality that can reflect or redirect incoming EM waves as well as absorb those undesired out-of-band harmonics and intermodulation products of reflecting those EM wireless signals. For example, those incoming wireless EM waves of either of the second- or third-order harmonics in are absorbed to a degree that any reflection of these undesired out-of-band frequencies are muted or reduced as indicated with the reduced reflected beams 295-1 through 295-6.

In another embodiment, each of the metasurface unit cell subsections 264-1, 264-2, 264-3, 264-4, 264-5, 264-6 may be separated from each other by a distance such that the redirected EM waves do not interfere with each other. In a specific embodiment, the metasurface unit cell subsections 264-1, 264-2, 264-3, 264-4, 264-5, 264-6 may be separated from each neighboring metasurface unit cell subsections 264-1, 264-2, 264-3, 264-4, 264-5, 264-6 by at least a distance of a length of one or two metasurface unit cells 266-1 through 266-6 and 268-1 through 268-6. Thus, in the example embodiment, the metasurface unit cell array 262 shown in FIG. 2 may be used to redirect a single incoming EM wave in six distinct beam directions while limiting interference of the beams.

As described herein, the presently-described static metasurface unit cell array 262 of embodiments herein provides directional signal enhancement by precisely redirecting enhanced EM waves without the need for electronic components or complex software algorithms. Still further, the static metasurface unit cell array 262 may be a low-cost and maintenance free solution that makes the static metasurface unit cell array 262 ideal for widespread deployment. This static metasurface unit cell array 262 may be easily integrated into existing laptop designs without significant cost or complexity thereby providing a long-term enhancement to wireless connectivity without the need for updates or active management. Still further, the static metasurface unit cell array 262 offers enhanced coexistence with passive collaboration among the information handling systems 200 so that signal strength is enhanced and network reliability for each information handling system 200 can leverage the presence of multiple laptops in order to enhance the network coverage.

Figure 3A:
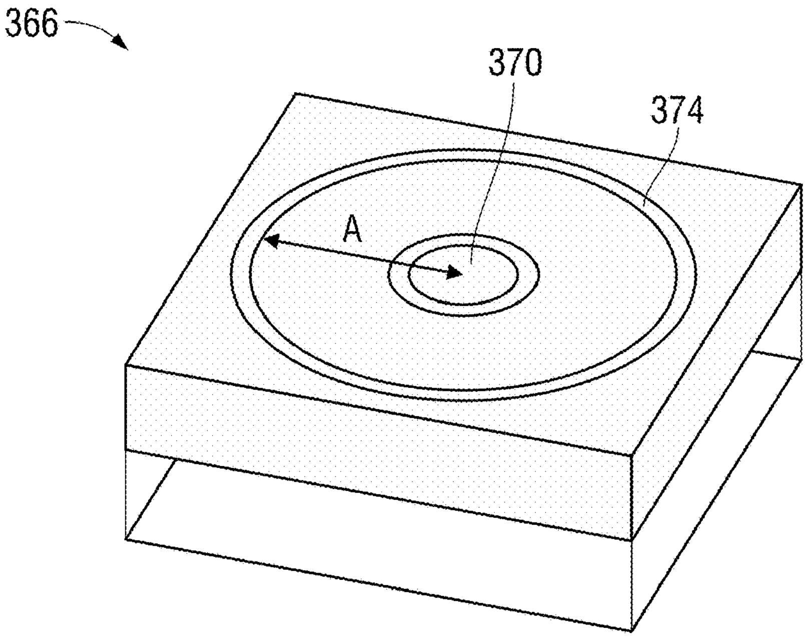
FIG. 3A is a graphic diagram of a metasurface unit cell that may be formed within the static metasurface unit cell array according to an embodiment of the present disclosure.
Figure 3B:
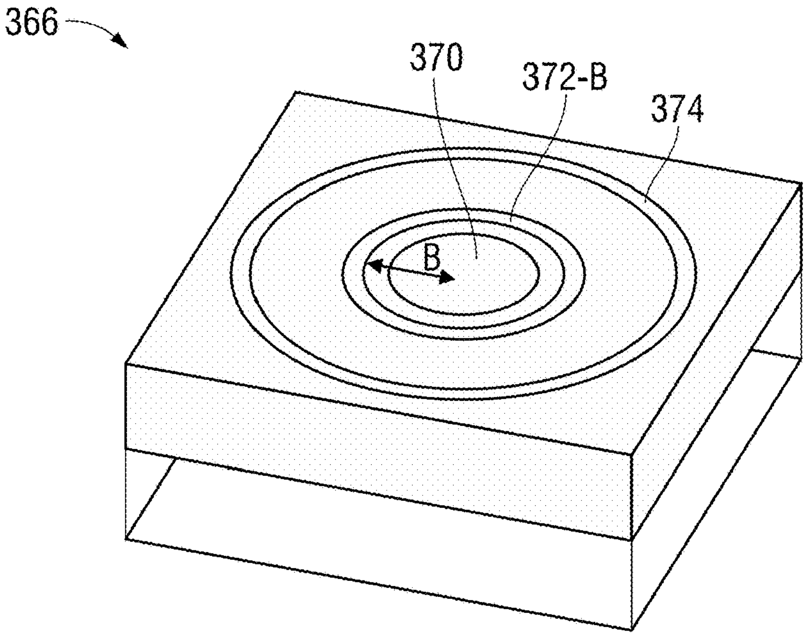
FIG. 3B is a graphic diagram of a metasurface unit cell that may be formed within the static metasurface unit cell array according to another embodiment of the present disclosure.
Figure 3C:
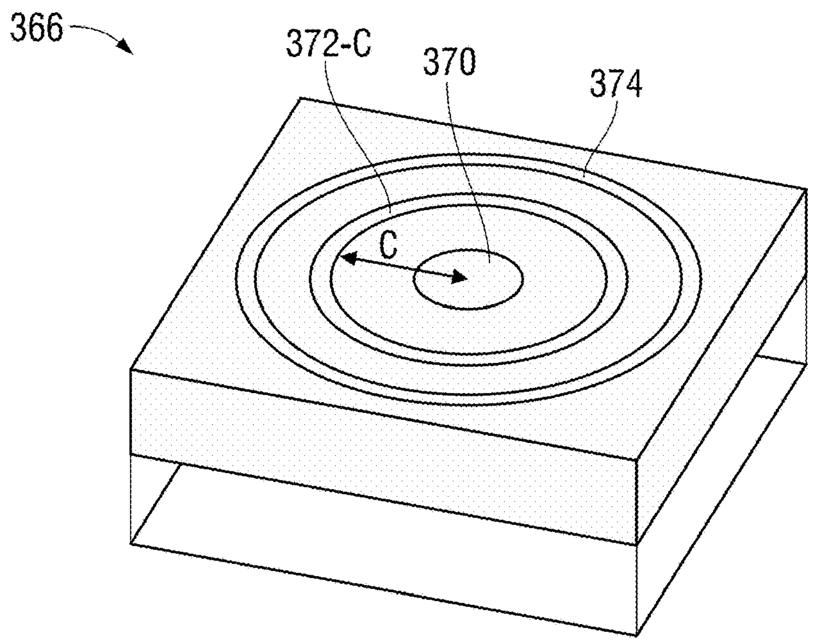
FIG. 3C is a graphic diagram of a metasurface unit cell that may be formed within the static metasurface unit cell array according to another embodiment of the present disclosure.
Figure 3D:
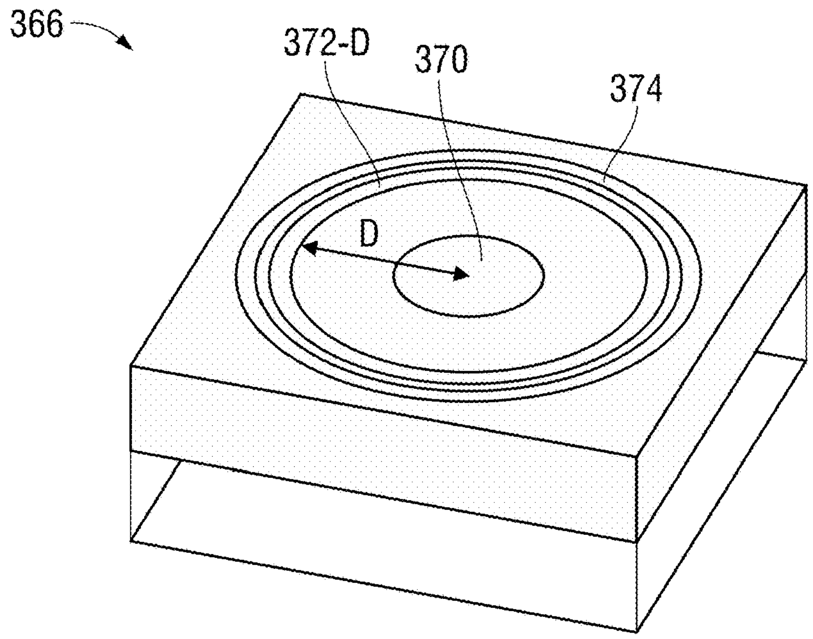
FIG. 3D is a graphic diagram of a metasurface unit cell that may be formed within the static metasurface unit cell array according to yet another embodiment of the present disclosure.

FIG. 3A is a graphic diagram of a unit cell 366-A within the static metasurface unit cell array according to an embodiment of the present disclosure. Additionally, FIGS. 3B-3D are also graphic diagrams of other static unit cells 366-B, 366-C, and 366-D that may be used within a static metasurface unit cell array or subsections thereof according to other embodiments of the present disclosure. The unit cells 366-A, 366-B, 366-C, and 366-D shown in FIGS. 3A-3D show different configurations which may include a first metallic concentric ring such as 372-B, 372-C, and 372-D (or no first metallic concentric ring as in FIG. 3A) and second metallic concentric ring 374 relative to an inner metallic dot or node 370. As described herein, these static unit cells 366-A, 366-B, 366-C, and 366-D may be formed to create a specific phase shifting that, as part of a group of unit cells within any given metasurface unit cell subsection, redirects incoming EM waves and may determine the gain of that EM wave using constructive and/or destructive interference principles in each redirected directionality beam as described in embodiments herein. Each metasurface unit cell subsection may include a variety of the metasurface unit cells such as those shown at 366-A, 366-B, 366-C, or 366-D in FIGS. 3A-3D or others with varying configurations of metallic concentric rings to generate a phase shifting between and among the metasurface unit cells across each metasurface unit cell array subsection to generate a directionality beam of redirected EM waves for the radiofrequency signals. It is appreciated that other types of metasurface unit cells may be used to form the individual metasurface unit cell subsections of the metasurface unit cell array than those shown in FIGS. 3A-3D. Thus, those metasurface unit cells 366-A, 366-B, 366-C, and 366-D shown and described in connection with FIGS. 3A-3D are merely examples and the present specification contemplates that other types of static metasurface unit cells may be used to form the metasurface unit cell subsections as described herein.

FIG. 3A shows a first example of a second metallic concentric ring 374 relative to the central inner metallic dot 370 of the static metasurface unit cell 366-A. Each of the inner metallic dot 370 and the second metallic concentric ring 374 may act as a specific resonating element within the metasurface unit cell 366-A that causes a phase shift of the incoming EM wave such that, through constructive and/or destructive interference with other metasurface unit cells in a metasurface unit cell array subsection creates the directionality beam of the redirected EM wave. As shown in FIG. 3A, the distance "A" between the inner metallic dot 370 and the second metallic concentric ring 374 may be 3.0 mm, however dimensions may depend upon the EM wave wavelengths and frequencies being redirected and reflected in various embodiments herein. This dimension is such that this arrangement creates a specific static phase shift profile that may be used to contribute to the reflection and redirection of incoming EM waves across plural metasurface unit cells in a metasurface unit cell subsection.

FIG. 3B shows a second example of the orientation of a first metallic concentric ring 372-B and second metallic concentric ring 374 relative to the central inner metallic dot 370 of the unit cell 366-B. Each of the inner metallic dot 370, the first metallic concentric ring 372-B, and the second metallic concentric ring 374 may act as a specific resonating element within the metasurface unit cell 366-B that causes a phase shift of the incoming EM wave such that, through constructive and/or destructive interference creates the directionality of the redirected EM wave. As shown in FIG. 3B, the distance “B” between the inner metallic dot 370 and the first metallic concentric ring 372-B is relatively smaller than that shown in FIGS. 3C (i.e., 372-C) and D (i.e., 372-D) such that the first metallic concentric ring 372-B is closer to the inner metallic dot 370. This distance “B”, in an embodiment, may be 1.00 mm, however dimensions may depend upon the EM wave wavelengths and frequencies being redirected and reflected in various embodiments herein. This arrangement creates a specific static phase shift profile that may be used to contribute to the reflection and redirection of incoming EM waves across plural metasurface unit cells in a metasurface unit cell subsection due to constructive or destructive interference among unit cells.

FIG. 3C shows a third example of the orientation of the first metallic concentric ring 372-C and second metallic concentric ring 374 relative to the central inner metallic dot 370 of the unit cell 366-C. Again, each of the inner metallic dot 370, the first metallic concentric ring 372-C, and the second metallic concentric ring 374 may act as a specific resonating element within the metasurface unit cell 366-C that causes a phase shift of the incoming EM wave such that, through constructive and/or destructive interference creates the directionality of the redirected EM wave. As shown in FIG. 3C, the distance “C” between the inner metallic dot 370 and the first metallic concentric ring 372-C is relatively larger than that shown in FIG. 3B for 372-B such that the first metallic concentric ring 372-C is placed about midway between the second metallic concentric ring 374 and the inner metallic dot 370. This distance “C”, in an embodiment, may be 1.50 mm, however dimensions may depend upon the EM wave wavelengths and frequencies being redirected and reflected in various embodiments herein. This arrangement creates a specific static phase shift profile that may be used to contribute to the reflection and redirection of incoming EM waves across plural metasurface unit cells in a metasurface unit cell subsection due to constructive or destructive interference among unit cells.

FIG. 3D shows a fourth example of the orientation of the first metallic concentric ring 372-D and second metallic concentric ring 374 relative to the central inner metallic dot 370 of the unit cell 366-D. Again, each of the inner metallic dot 370, the first metallic concentric ring 372-D, and the second metallic concentric ring 374 may act as a specific resonating element within the metasurface unit cell 366-D that causes a phase shift of the incoming EM wave such that, through constructive and/or destructive interference creates the directionality of the redirected EM wave. As shown in FIG. 3D, the distance “D” between the inner metallic dot 370 and the first metallic concentric ring 372-D is relatively larger than that shown in FIG. 3C for 372-C such that the first metallic concentric ring 372-D is placed closer to the second metallic concentric ring 374 than the inner metallic dot 370. This distance “D”, in an embodiment, may be 2.00 mm, however dimensions may depend upon the EM wave wavelengths and frequencies being redirected and reflected in various embodiments herein. This arrangement creates a specific static phase shift profile that may be used to contribute to the reflection and redirection of incoming EM waves across plural metasurface unit cells in a metasurface unit cell subsection due to constructive or destructive interference among unit cells.

Figure 4A:
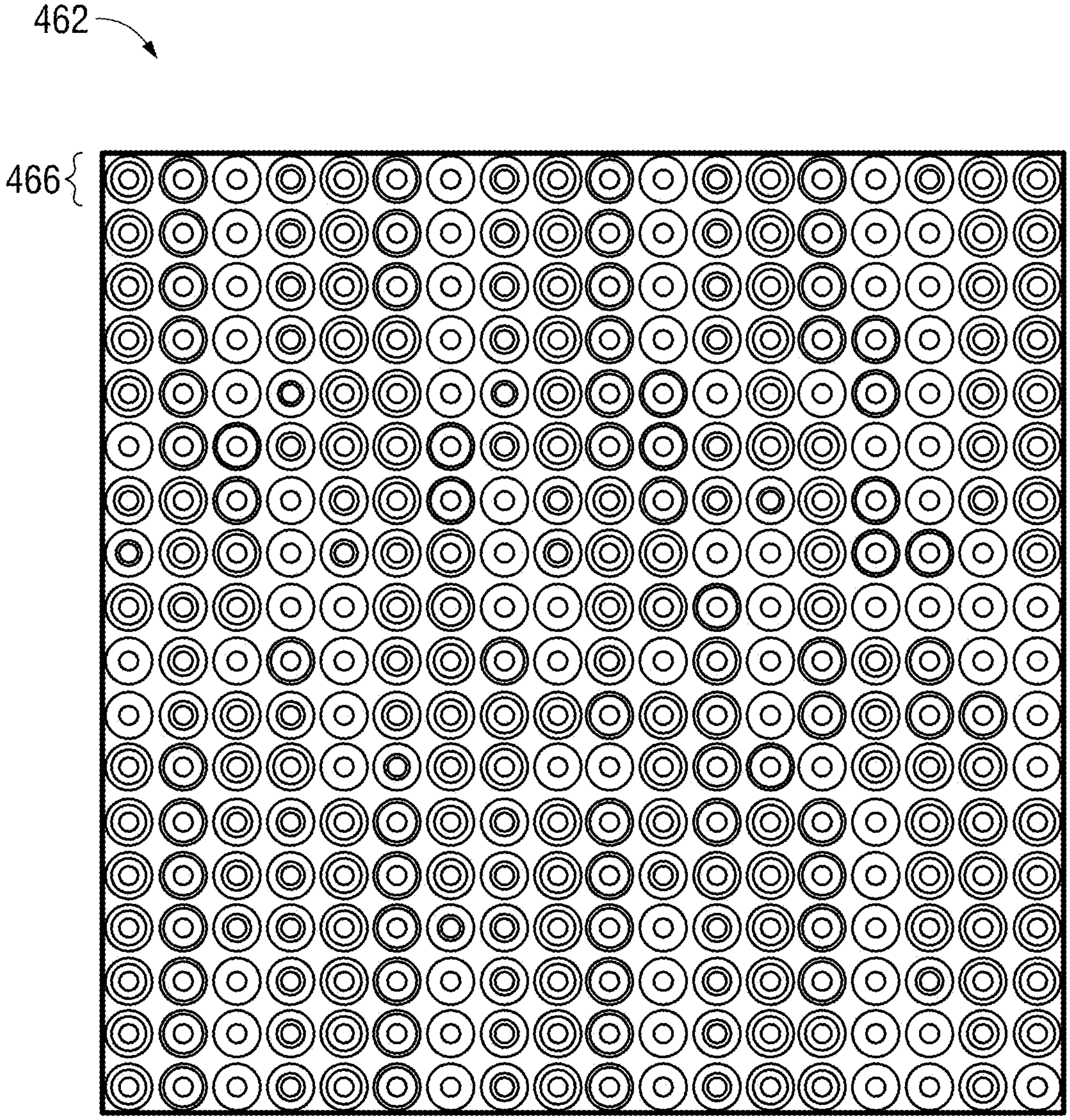
FIG. 4A is a graphic diagram illustrating a static metasurface unit cell array having an array of eighteen by eighteen unit cells according to an embodiment of the present disclosure.
Figure 4B:
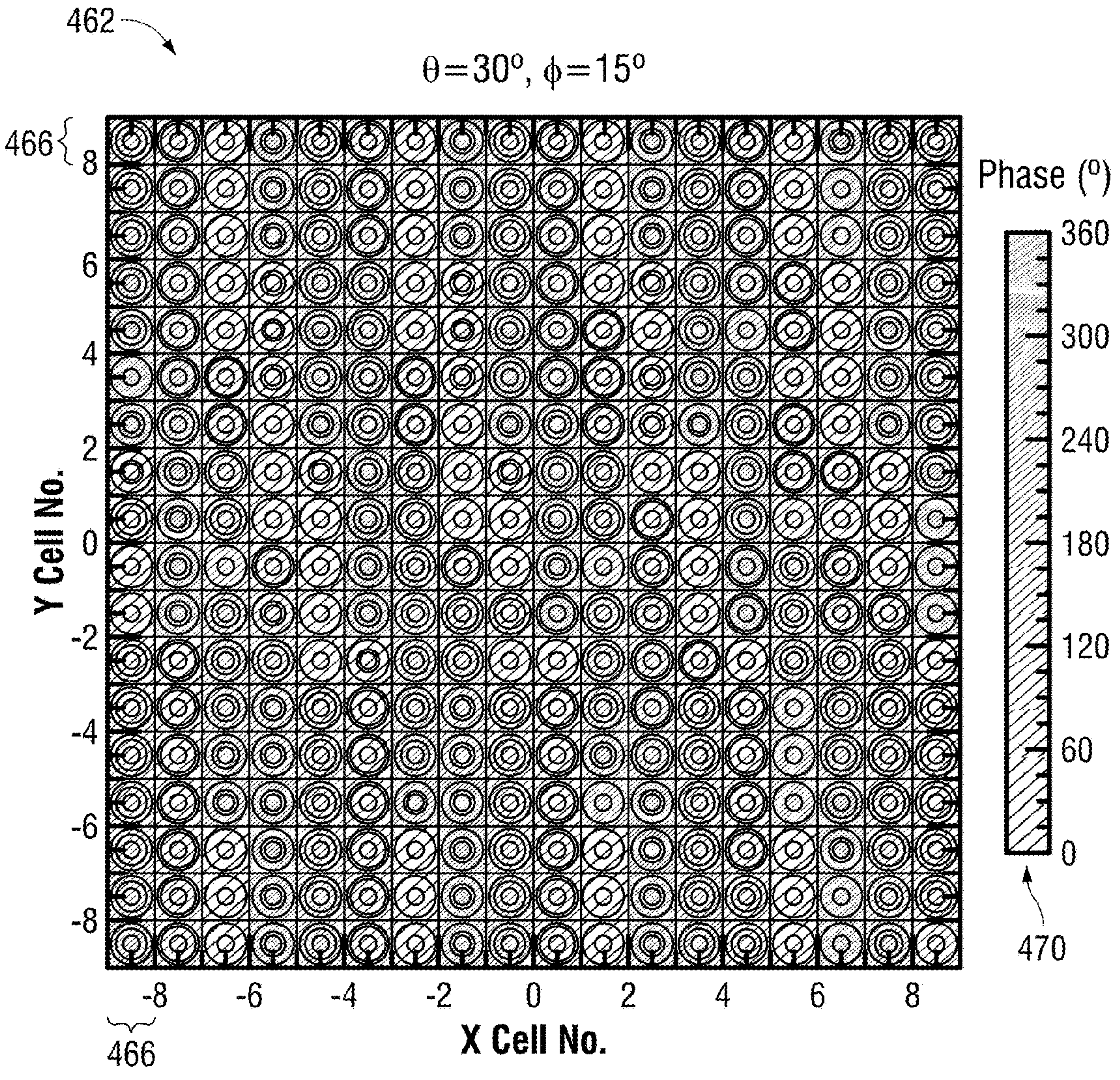
FIG. 4B is a graphic diagram of a phase pattern resulting from the formation and placement of the unit cells in a static metasurface unit cell array according to an embodiment of the present disclosure.

FIG. 4A is a graphic diagram illustrating a metasurface unit cell array 462 having an array of unit cells 466 described in FIGS. 3A-3D according to an embodiment of the present disclosure. As such, FIG. 4B is a graphic diagram of a phase pattern resulting from the formation and placement of the unit cells in FIG. 4A according to an embodiment of the present disclosure. As described herein, the individual unit cells 466 that are arranged within the metasurface unit cell array 262 may be formed such that EM waves may be redirected as described in, for example, FIG. 2. The metasurface unit cell array 462 shown in FIGS. 4A and 4B includes eighteen by eighteen unit cells 466 in one embodiment, however it is contemplated that a metasurface unit cell array 462 with any number of unit cells 466 is contemplated in other embodiments.

As shown in FIG. 4A, those unit cells 466 may include the unit cells shown in FIGS. 3A through 3D. As described in FIGS. 3A through 3D, the arrangement of each of the outer metallic concentric ring (e.g., 374, FIGS. 3A through 3D) relative to the inner metallic dot or node (e.g., 370, FIGS. 3A through 3D) and, in some unit cells 466, relative to a second middle metallic concentric ring (e.g., 372-B, 372-C and 372-D in FIGS. 3A through 3D), or even additional middle second rings, creates the constructive interference that beamforms the incoming EM waves to redirect them in a specific direction. As shown in FIG. 4B, this redirected direction may be a 30° direction across the horizontal azimuth with a 15° redirected direction in a vertical direction. It is appreciated that, however, the phase pattern created by the formation and layout of the cells 466 and shown in FIG. 4B may be altered in order to create a specific beam that is beamformed at a specific direction away from the surface of the metasurface unit cell array 462.

The arrangement of each of the outer metallic concentric ring (e.g., 374, FIGS. 3A through 3D) relative to the inner metallic dot or node (e.g., 370, FIGS. 3A through 3D) and relative to any second middle metallic concentric ring (e.g., 372-B, 372-C and 372-D in FIGS. 3A through 3D) determines a phase shift of reflected EM waves at a particular radiofrequency communication wavelength depending on the dimension of the unit cells 466 and the distances between the inner metal dot or node, the outer concentric ring, and any second middle metallic concentric rings according to embodiments herein. In an example embodiment of FIG. 4B, the phase shift is shown in shading gradient key 470 that corresponds to the shading of each unit cell in FIG. 4B. The layout selection of the unit cells 466 with different concentric ring arrangements is distributed in patterns across the metasurface unit cell array 462. These patterns of unit cells 466 with varying phase shifting form constructive and destructive bands that are used to redirect EM waves at those particular frequency as across the span of the metasurface unit cell array 462 in embodiments herein. As shown in FIG. 4B, the patterns of phase shifting corresponding to the phase shift key 470 of the layout of the unit cells 466 form bands of phase shifting across the metasurface unit cell array 462 that can be seen in FIG. 4B and which contribute to redirection of lobes of EM waves by the metasurface unit cell array 462 to the 30° direction across the horizontal azimuth with a 15° redirected direction in a vertical direction according to embodiments herein. The arrangement of the unit cells 466 across the metasurface unit cell array 462 may be made in any pattern of phase shifting for those unit cells such that constructive or destructive interference causes an overall redirection across a variety of horizontal azimuth directions as well as vertical direction components in various embodiments herein.

Although FIGS. 4A and 4B show a specific type of static unit cells 466 forming the metasurface unit cell array 462, the present specification contemplates that other types of unit cells 466 may be used. Indeed, the outer metallic concentric rings (e.g., 374, FIGS. 3A through 3D), the inner metallic dot or node (e.g., 370, FIGS. 3A through 3D) of each unit cell 466, as well as any middle metallic concentric rings (e.g., 372-B, 372-C and 372-D in FIGS. 3A through 3D) described in FIGS. 3A through 3D are meant only as an example structure of the individual unit cells 466 and the present specification contemplates that other forms of EM wave resonators may be used. In the context of the present specification, the metasurface unit cell array 462 may comprise a plurality of the metasurface unit cells 466 shown and described in FIGS. 4A and 4B such that a single metasurface unit cell array 462 may concurrently redirect two distinct wireless frequencies. Further, in other embodiments, the metasurface unit cells 466 may be formed for absorbing frequencies, such as second order harmonics metasurface unit cell absorber subsections (e.g., 270, FIG. 2) and third order harmonics when formed in metasurface unit cell absorber subsections (e.g., 272, FIG. 2) from EM waves of received radiofrequency signals from an access point in a radiofrequency environment or from other conflicting access points in a radiofrequency environment. In an example embodiment, those second- and third-order harmonics absorbed by some versions of the metasurface unit cells 466 are associated with distinct frequencies that may be redirected by other adjacent metasurface unit cells 466 that are arranged in bands or sections of phase shifting by those metasurface unit cells 466 formed in the metasurface unit cell array according to embodiments herein. Another example of a type of unit cell is described in FIG. 5.

Figure 5:
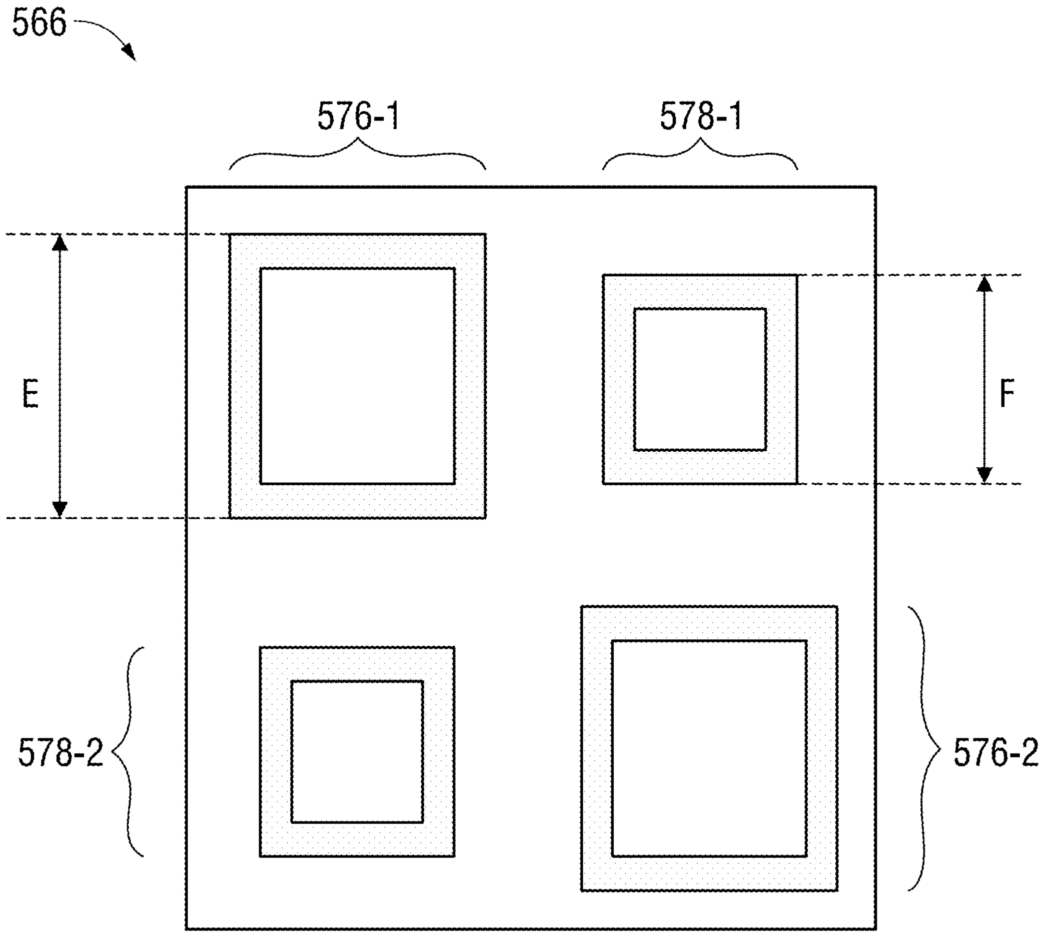
FIG. 5 is a graphic diagram of a metasurface unit cell that may be formed within the static metasurface unit cell array according to another embodiment of the present disclosure.

FIG. 5 is a graphic diagram of a metasurface unit cell 566 that may be formed within the static metasurface unit cell array according to another embodiment of the present disclosure. As described herein, the metasurface unit cell 566 may include various types of resonators. Thus, the example embodiment shown in FIG. 5 is merely another example of a metasurface unit cell 566 and the present specification contemplates various other arrangements and forms of resonators in the metasurface unit cell 566.

It is appreciated that some metasurfaces are limited by their ability to redirect multiple frequency bands simultaneously. Some metasurfaces require separate surfaces or layers to address the redirection of each frequency band that arrives at the metasurface. These issues lead to an increase in the physical footprint of the metasurface or increased complexity of design and manufacturing of the metasurface. The metasurface unit cell 566, however, addresses these issues by including, within a single metasurface unit cell 566, distinct reflecting elements that are each formed to resonate at a specific frequency band. This configuration of the arranged metasurface unit cells 566 along the surface of the static metasurface unit cell array allows the metasurface unit cell array to operate in dual-band mode without the need for multiple layers or additional hardware. Thus, the metasurface unit cell array may reflect, for example, Wi-Fi EM signals and 5G-NR EM signals without creating interference patterns among the two distinct frequencies. In the context of the present specification, the metasurface unit cell array may comprise a plurality of the metasurface unit cells 566 shown and described in FIG. 5 such that a single metasurface unit cell array may concurrently redirect two distinct wireless frequencies. Further, in other embodiments, the metasurface unit cells 566 may be formed for absorbing frequencies, such as second order harmonics metasurface unit cell absorber subsections (e.g., 270, FIG. 2) and third order harmonics when formed in metasurface unit cell absorber subsections (e.g., 272, FIG. 2) from EM waves of received radiofrequency signals from an access point in a radiofrequency environment or from other conflicting access points in a radiofrequency environment. In an example embodiment, those second- and third-order harmonics absorbed by some versions of the metasurface unit cells 566 are associated with distinct frequencies that may be redirected by other adjacent metasurface unit cells 566 that are arranged in bands of phase shifting by the metasurface unit cells 566 from sections formed in the metasurface unit cell array according to embodiments herein.

The metasurface unit cell 566 shown in FIG. 5 includes a first sized resonator 576-1, 576-2 and a second sized resonator 578-1, 578-2. The sizing "E" of the first sized resonator 576-1, 576-2, for example, may be selected such that it resonates at a first frequency such as a Wi-Fi frequency (e.g., 2.4 GHz). Additionally, the sizing "F" of the second sized resonator 578-1, 578-2, for example may be selected such that it resonates at a second frequency that may include a relatively high frequency. This relatively higher frequency may include a 5G-NR frequency such as a frequency range (FR) 1 sub-6 GHz frequency or an FR2 mmWave frequency (e.g., 24.25 GHz through 71 GHz). It is appreciated that the sizing of the first sized resonator 576-1, 576-2 and second sized resonator 578-1, 578-2 may be selected based on any specific intended frequency intended to be reflected off of the metasurface unit cell array. In other versions of metasurface unit cell 566, the first sized resonator 576-1, 576-2 and the second sized resonator 578-1, 578-2 may be selected for absorption of particular second or third order harmonics and may be arranged across the metasurface unit cell array in bands adjacent to reflecting metasurface unit cells 566 according to embodiments herein.

Figure 6:
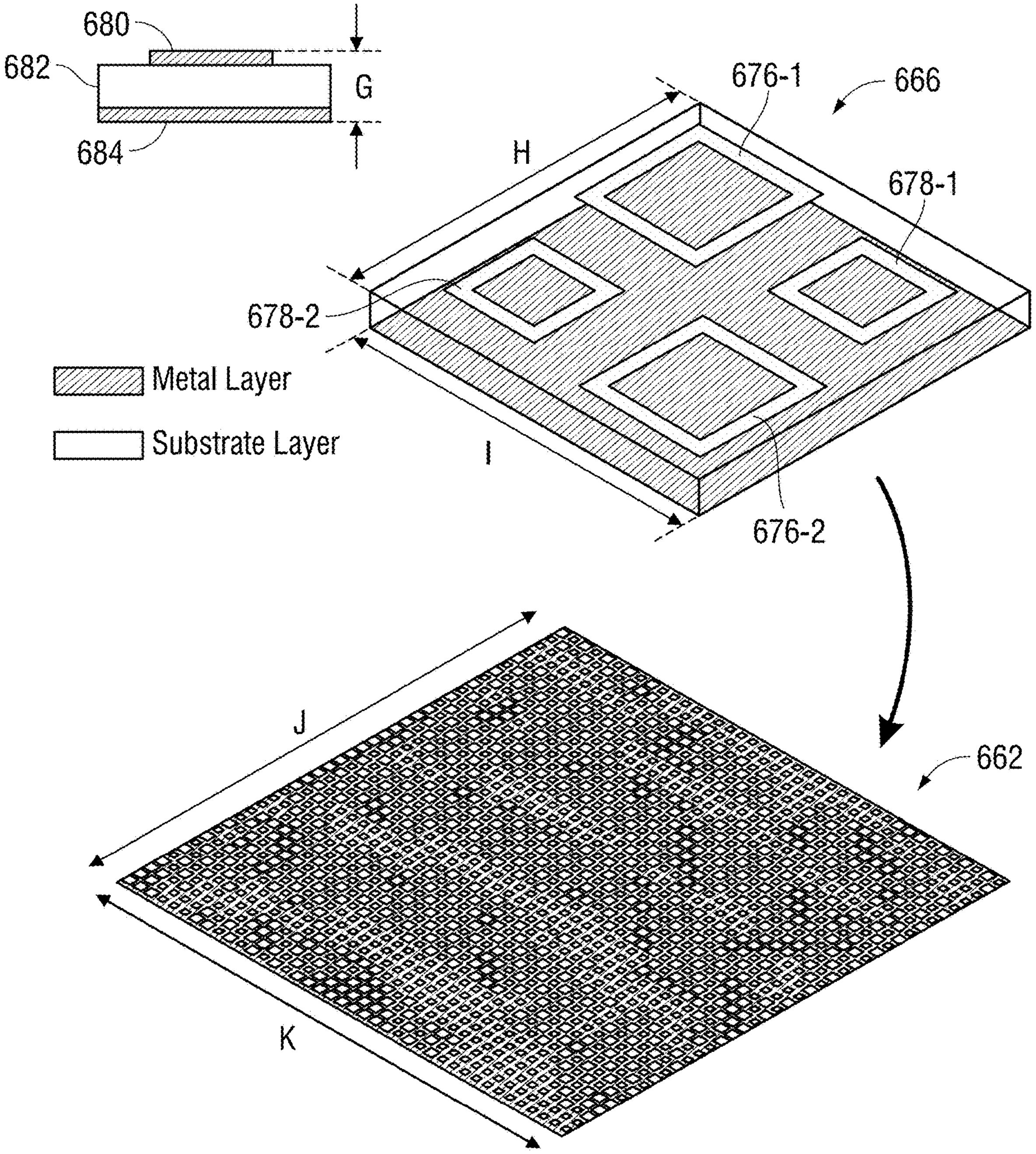
FIG. 6 is a graphic diagram of a metasurface unit cell and a correlating static metasurface unit cell array made of a plurality of metasurface unit cells shown according to an embodiment of the present disclosure.

FIG. 6 is a graphic diagram of a metasurface unit cell 666 and a correlating static metasurface unit cell array 662 made of a plurality of metasurface unit cells similar to that shown in FIG. 5 according to an embodiment of the present disclosure. FIG. 6 additionally shows a side, cross-sectional view of a portion of an individual metasurface unit cell 666 according to an embodiment herein.

In an embodiment, the metasurface unit cell 666 may include a resonator layer 680 that includes each of the first sized resonators 676-1, 676-2 and second sized resonators 678-1, 678-2 described in connection with FIG. 5 for example. As described herein, this resonator layer 680 may include one or more first sized resonators 676-1, 676-2 and one or more second sized resonators 678-1, 678-2 made of a metal. The first metal layer with resonators of the resonator layer 680 may be formed on top of a substrate layer 682. In an embodiment, the substrate layer 682 may be made of a dielectric material such as fused silica, silicon, silicon dioxide, and other high-performance low-loss dielectrics such as Rogers RO400 series dielectrics.

In one example, the metasurface unit cell 666 may also include a bottom metal layer 684 that may operate as a reflective surface. In another example embodiment, the metasurface unit cell 666 may not include the bottom metal layer 684 when the metasurface unit cell 666 is formed to operate as an absorbing metasurface unit cell 666. As described herein, the entire metasurface unit cell array 662 may include portions of metasurface unit cells 666 having the bottom metal layer 684 and other portions of metasurface unit cells 666 having no bottom metal layer 684. These second portions of metasurface unit cells 666 having no bottom metal layer are where the second order harmonics metasurface unit cell absorber subsections and/or third order harmonics metasurface unit cell absorber subsections have been formed on the metasurface unit cell array 662. In an embodiment, the bottom metal layer 684 may be removed from or never formed in the first place under the substrate layer 682 of those second portions of the metasurface unit cell array 662 where the second order harmonics metasurface unit cell absorber subsections and third order harmonics metasurface unit cell absorber subsections have been formed such that second- and third-order harmonics associated with one or more frequencies may be absorbed instead of redirected such as with the first portion metasurface unit cell subsections, such as those with a bottom metal layer 684 as described herein.

In an embodiment, the stack of the resonator layer 680, the substrate layer 682, and the bottom metal layer 684 may have a thickness "G" of between 0.25 mm and 0.60 mm. In an embodiment, the stack of the resonator layer 680, the substrate layer 682, and the bottom metal layer 684 may have a thickness "G" of 0.44 mm. In an embodiment, the metasurface unit cell 666 may have a length "H" and width "I" of between 2.00 mm and 3.00 mm. In one particular embodiment, the metasurface unit cell 666 may have a length "H" and width "I" of 2.45 mm. Additionally, in an embodiment, the metasurface unit cell array 662 may be a panel having a length "J" and a width "K" of between 9 and 11 cm. In one example embodiment, the metasurface unit cell array 662 may have a length "J" and a width "K" of 10 cm. The size of the metasurface unit cells 666 and the metasurface unit cell array 662 panel may depend on the radiofrequency signal EM wavelengths being reflected or absorbed and the level of gain or directionality precision desired. Lower wavelength/higher frequency signals may have smaller dimensioned metasurface unit cells 666 due to utilizing smaller sized resonators 676-1, 676-2 or 678-1, 678-2 in example embodiments herein. Thus, more metasurface unit cells 666 may fit in a metasurface unit cell array 662 panel or a smaller metasurface unit cell array 662 panel may be used.

As shown in FIG. 6, a plurality of metasurface unit cells 666 may be arranged along the surface of the metasurface unit cell array 662 so that the individual first sized resonators 676-1, 676-2 and second sized resonators 678-1, 678-2 of each of the metasurface unit cells 666 generate a phase shift in reflected signals. The arrangement of the metasurface unit cells 666 are such that neighboring metasurface unit cells 666 generate constructive or destructive interference to redirect a distinct frequency from off of the surface of the metasurface unit cell array 662 in particular direction having horizontal or vertical components relative to the metasurface unit cell array 662 panel. It is appreciated as well that the sizes of the individual first sized resonators 676-1, 676-2 and second sized resonators 678-1, 678-2 within each of the metasurface unit cells 666 as well as within the entire metasurface unit cell array 662 can be sized down or up to create a phase shift for that metasurface unit cell 666 and those metasurface unit cells 666 are arranged in a pattern such that the metasurface unit cell array 662 can be used to beam steer any redirected EM waves at a specific direction horizontally, vertically or some combination of direction. Further, the phase shift of each of the metasurface unit cells 666 also generates or causes second order and third order harmonics at or across the metasurface unit cells 666 of the metasurface unit cell array 662 panel. Other metasurface unit cells 666 are situated in embodiments herein as absorber metasurface unit cells 666 in the metasurface unit cell array 662 panel to absorb and reduce those second and third order harmonic frequencies generated at the metasurface unit cell array 662 to improve gain and precision of directionality of the redirected radiofrequency EM wave signals by other portions of the metasurface unit cells 666.

Figure 7:
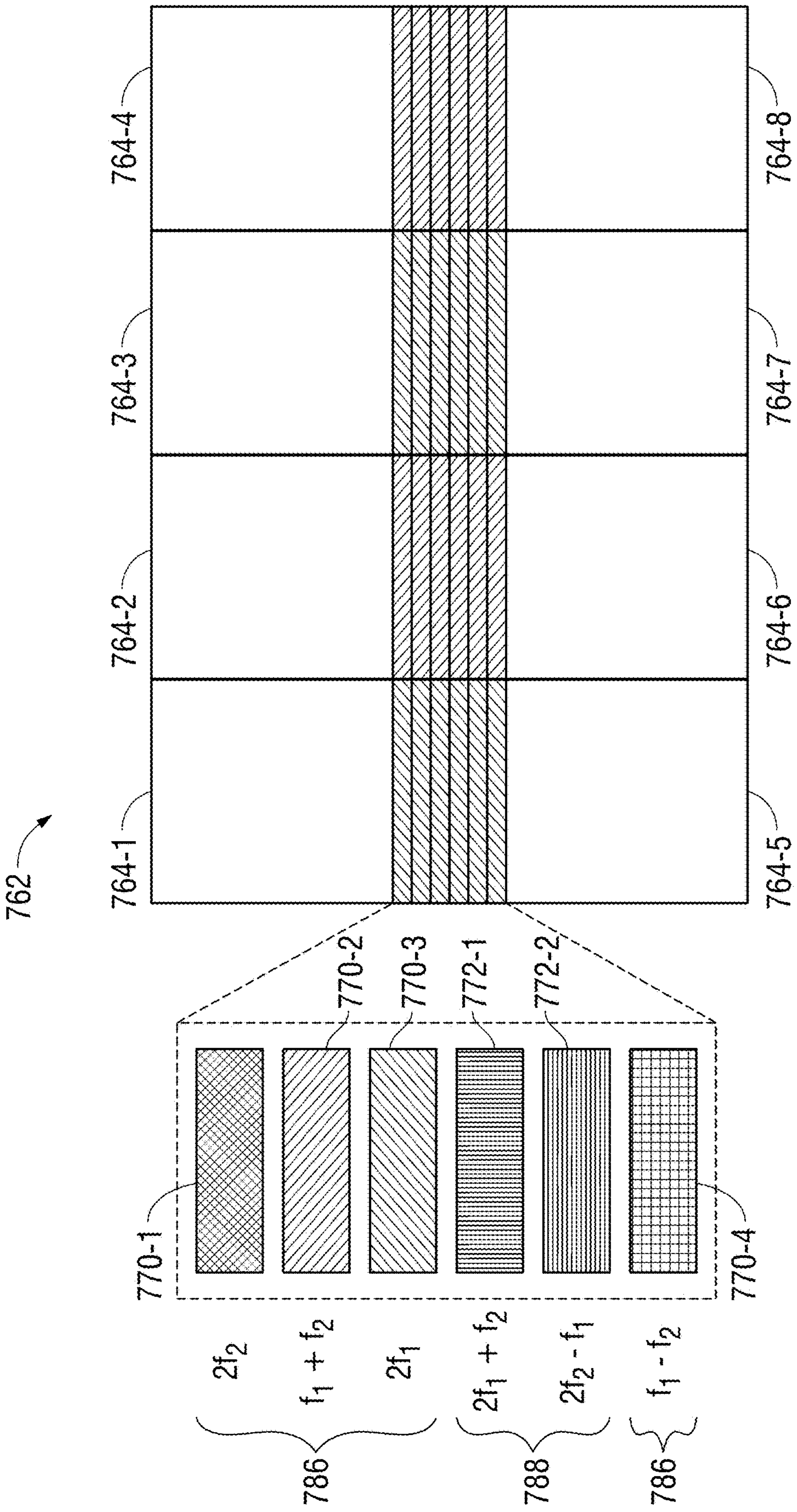
FIG. 7 is a graphic diagram illustrating a metasurface unit cell array having individual metasurface unit cell subsections used to redirect incoming electromagnetic waves at a plurality of angles and including one or more harmonics metasurface unit cell absorber subsections according to an embodiment of the present disclosure.

FIG. 7 is a block diagram illustrating a metasurface unit cell array 762 that is separated into individual slices or metasurface unit cell subsections 764-1, 764-2, 764-3, 764-4, 764-5, 764-6, 764-7, 764-8 used to redirect incoming electromagnetic waves along the horizontal azimuth as well as a one or more vertical direction components according to an embodiment of the present disclosure. Further, the metasurface unit cell array 762 of FIG. 7 includes plural second order harmonics metasurface unit cell absorber subsections 770-1, 770-2, 770-3, 770-4 and one or more third order harmonics metasurface unit cell absorber subsections 772-1, 772-2 according to an embodiment of the present disclosure. Again, it is appreciated that plural vertical or elevational components of the directionality of the redirected EM wave may also be incorporated into one or more of the metasurface unit cell subsections such that pairs 764-1 and 764-5, 764-2 and 764-6, 764-3 and 764-7, as well as 764-4 and 764-8 are formed to have similar horizontal azimuth directions of reflection, but differing vertical components. In such an embodiment, the metasurface unit cell array 762 may have a broader selection of directions for redirecting incoming EM waves to provide greater extension and reach of the wireless signals. However, these similar horizontal directions may be more susceptible to interference from second or third order harmonics from the other in some example embodiments. Thus, the formation of the individual metasurface unit cells within each of the metasurface unit cell subsections 764-1, 764-2, 764-3, 764-4, 764-5, 764-6, 764-7, 764-8 that can redirect the incoming EM waves up or down relative to the surface of the metasurface unit cell array 766 may be susceptible to interference and intermodulation from second and third order harmonics generated at these subsections in example embodiments.

It is appreciated that each of the metasurface unit cell subsections 764-1, 764-2, 764-3, 764-4, 764-5, 764-6, 764-7, 764-8 may each include a specific arrangement of unit cells such as those shown in FIGS. 3A-3D or FIG. 6 such that a specific phase pattern as shown and described in connection with FIGS. 4A and 4B result in redirection in different horizontal directions as well as different vertical directions. Thus, although the present specification may describe any of the metasurface unit cell subsections 764-1, 764-2, 764-3, 764-4, 764-5, 764-6, 764-7, 764-8 including a plurality of unit cells that beamform a reflected EM wave from off of the surface of the metasurface unit cell array 762 at a specific angle, these are merely examples. The present specification contemplates that the metasurface unit cell subsections 764-1, 764-2, 764-3, 764-4, 764-5, 764-6, 764-7, 764-8 may redirect reflected EM waves at any direction horizontally and/or vertically from off of the surface of the metasurface unit cell array 762. In a specific example embodiment, a top row of metasurface unit cell subsections 764-1, 764-2, 764-3, 764-4 may generally direct the reflected EM waves in an upward direction as well as in horizontal directions across the horizontal azimuth while a bottom row of metasurface unit cell subsections 764-5, 764-6, 764-7, 764-8 may generally direct the reflected EM waves in a downward direction as well as in horizontal directions across the horizontal azimuth.

In an example embodiment, the metasurface unit cells of the first metasurface unit cell subsection 764-1 may be configured to redirect an incoming EM wave in a first direction having a first direction vertical and/or horizontal component. Specifically, the first metasurface unit cell subsection 764-1 may redirect the EM wave between −120° to −60° along the horizontal azimuth and, in an embodiment, in a vertical direction angled upward. In this example embodiment, the second metasurface unit cell subsection 764-2 of the metasurface unit cell array 762 may redirect the EM wave in a second direction along a horizontal azimuth such as between −60° to 0° along the azimuth and in a vertical direction angled upward. Additionally, in this example embodiment, the third metasurface unit cell subsection 764-3 of the metasurface unit cell array 762 may redirect incoming EM waves in a third direction along the horizontal azimuth such as between 0° to 60° along the azimuth and in a vertical direction angled upward. Even further, the fourth metasurface unit cell subsection 764-4 of the metasurface unit cell array 762 may redirect incoming EM waves in a fourth direction along the horizontal azimuth such as between 60° to 120° along the azimuth and in a vertical direction angled upward. Again, in an embodiment, each of the metasurface unit cell subsections 764-1, 764-2, 764-3, 764-4 formed in a top row on the metasurface unit cell array 762 may direct reflected EM waves in an upward direction as well relative to the bottom row of metasurface unit cell subsections 764-5, 764-6, 764-7, 764-8.

In an example embodiment, the metasurface unit cells of the fifth metasurface unit cell subsection 764-5 may be configured to redirect an incoming EM wave in a fifth direction either vertically or horizontally. Specifically, the fifth metasurface unit cell subsection 764-5 may redirect the EM wave between −120° to −60° along the azimuth and, in an embodiment, and in a vertical direction angled downward. In this example embodiment, the sixth metasurface unit cell subsection 764-6 of the metasurface unit cell array 762 may redirect the EM wave in a sixth direction along a horizontal azimuth such as between −60° to 0° along the azimuth and in a vertical direction angled downward. Additionally, in this example embodiment, the seventh metasurface unit cell subsection 764-7 of the metasurface unit cell array 762 may redirect incoming EM waves in a seventh direction along the horizontal azimuth such as between 0° to 60° along the azimuth and in a vertical direction angled downward. Even further, the eighth metasurface unit cell subsection 764-8 of the metasurface unit cell array 762 may redirect incoming EM waves in an eighth direction along the horizontal azimuth such as between 60° to 120° along the azimuth and in a vertical direction angled downward. Again, in an embodiment, each of the metasurface unit cell subsections 764-5, 764-6, 764-7, 764-8 formed in a bottom row on the metasurface unit cell array 762 may direct reflected EM waves in a downward direction as well relative to the top row of metasurface unit cell subsections 764-1, 764-2, 764-3, 764-4.

It is appreciated that the metasurface unit cell subsections 764-1, 764-2, 764-3, 764-4, 764-5, 764-6, 764-7, 764-8 may be bifurcated, horizontally, by a plurality of second order harmonics metasurface unit cell absorber subsections 770-1, 770-2, 770-3, 770-4 and a plurality of third order harmonics metasurface unit cell absorber subsections 772-1, 772-2 described herein. In one embodiment, the metasurface unit cell subsections 764-1, 764-2, 764-3, 764-4 formed above the metasurface unit cell absorber sections 770-1, 770-2, 770-3, 770-4, 772-1, 772-2 may be configured to redirect a first frequency of EM waves while the metasurface unit cell subsections 764-5, 764-6, 764-7, 764-8 formed below the metasurface unit cell absorber sections 770-1, 770-2, 770-3, 770-4, 772-1, 772-2 may be configured to redirect a second frequency of EM waves. Alternatively, in other embodiments the entire metasurface unit cell array 762 may include those metasurface unit cells which may redirect plural frequencies of EM waves. For example, metasurface unit cells such as those shown and described in connection with embodiments of FIGS. 5 and 6 may allow the entire surface of the metasurface unit cell array 762 to redirect multiple frequencies of EM waves into multiple directions (e.g., horizontal and/or vertical directions). Thus, in this embodiment, the placement of the metasurface unit cell absorber sections 770-1, 770-2, 770-3, 770-4, 772-1, 772-2 at the center of the metasurface unit cell array 762 is merely an example location of the metasurface unit cell absorber sections 770-1, 770-2, 770-3, 770-4, 772-1, 772-2 and the present specification contemplates that the location of the metasurface unit cell absorber sections 770-1, 770-2, 770-3, 770-4, 772-1, 772-2 may be placed anywhere on the metasurface unit cell array 762. Nonetheless, placement of the metasurface unit cell absorber sections 770-1, 770-2, 770-3, 770-4, 772-1, 772-2 may be adjacent to various sets of reflective metasurface unit cell subsections 764-1, 764-2, 764-3, 764-4 or 764-5, 764-6, 764-7, 764-8.

As described herein, the unit cells of the metasurface unit cell absorber sections 770-1, 770-2, 770-3, 770-4, 772-1, 772-2 may be any type of unit cell including those described in connection with FIGS. 3A through 4B or FIGS. 5 through 6. However, in order to operate as an EM wave absorbing layer, the metasurface unit cell absorber sections 770-1, 770-2, 770-3, 770-4, 772-1, 772-2 may not include a metallic backing layer in an embodiment. In a further embodiment, the metasurface unit cell absorber sections 770-1, 770-2, 770-3, 770-4, 772-1, 772-2 metasurface unit cell absorber sections 770-1, 770-2, 770-3, 770-4, 772-1, 772-2 may be configured with resonant structures thereon to create a destructive interference pattern targeting those second- and third-order harmonics generated from the EM wave frequencies reflected by the metasurface unit cell subsections 764-1, 764-2, 764-3, 764-4, 764-5, 764-6, 764-7, 764-8 that are adjacent on the metasurface unit cell array 762. With reference to FIG. 6, for example, the unit cells of the metasurface unit cell absorber sections 770-1, 770-2, 770-3, 770-4, 772-1, 772-2 may not include the bottom metal layer (e.g., FIG. 6, 684) such that those incoming second- and third-order harmonics of one or more frequencies may be absorbed instead of being redirected or reflected towards another receiving device. Further, the metasurface unit cell absorber sections 770-1, 770-2, 770-3, 770-4, 772-1, 772-2 may have resonant structures (e.g., FIG. 6, 676-1, 676-2, 678-1 and 678-2) sized and arranged to generate a phase shift to create a destructive interference pattern targeting those second- and third-order harmonics generated from the EM wave frequencies reflected by the adjacent or proximate metasurface unit cell subsections 764-1, 764-2, 764-3, 764-4, 764-5, 764-6, 764-7, 764-8. By having both EM wave reflective and absorptive metasurface unit cell elements within the static metasurface unit cell array 762, those second- and third-order harmonics of the EM waves are reduced while the serviceable area for gain of signal and precision of directionality for the wireless signals redirected by the metasurface unit cell array may be increased. Again, these second- and third-order harmonics of the EM waves may be created as the EM waves being reflected from each of the metasurface unit cell subsections 764-1, 764-2, 764-3, 764-4, 764-5, 764-6, 764-7, 764-8 interfere with each other. Although the metasurface unit cell subsections 764-1, 764-2, 764-3, 764-4, 764-5, 764-6, 764-7, 764-8 may be separated from each other by a distance (e.g., at least a width of two unit cells) in some embodiments, those redirected EM waves may still create the second- and third-order harmonics of the EM waves and cause interference. These second- and third-order harmonics of the EM waves are absorbed by operation of the adjacent sets of metasurface unit cell absorber sections 770-1, 770-2, 770-3, 770-4, 772-1, 772-2 in an example embodiment and mitigate interference and intermodulation from those second- and third-order harmonic frequencies according to embodiments herein.

As shown in FIG. 7, the metasurface unit cell absorber sections 770-1, 770-2, 770-3, 770-4, 772-1, 772-2 have been divided into multiple second order harmonics metasurface unit cell absorber subsections 770-1, 770-2, 770-3, 770-4 and third order harmonics metasurface unit cell absorber subsections 772-1, 772-2. In an embodiment, the second order harmonics metasurface unit cell absorber subsections 770-1, 770-2, 770-3, 770-4 may be divided into those various sets that absorb or reduce multiple second order harmonics as depicted at sections 786 including those that address the second-order harmonics of multiple blended frequency harmonics such as those (e.g., two distinct) frequencies incident to the metasurface unit cell array 762. In an embodiment, the third order harmonics metasurface unit cell absorber subsections 772-1, 772-2 may be divided into various sets that absorb or reduce multiple third order harmonics such as those depicted at 788 including those that also address third-order harmonics of multiple (e.g., two distinct) frequencies incident to the metasurface unit cell array 762.

Figure 8:
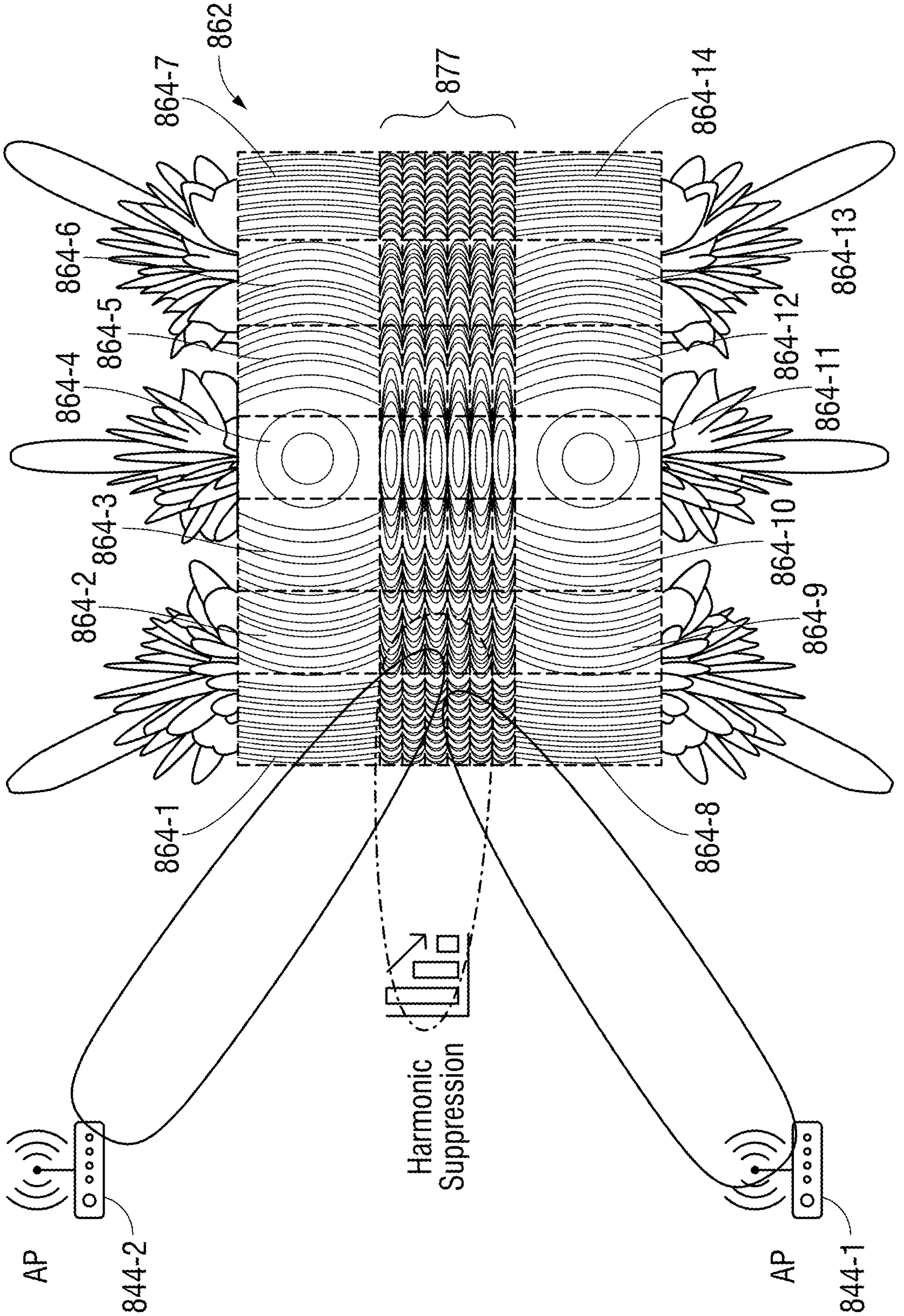
FIG. 8 is a graphic diagram of a phase pattern and reflected electromagnetic (EM) waves resulting from the formation and placement of a plurality of metasurface unit cell subsections and metasurface unit cell absorber sections according to an embodiment of the present disclosure.

FIG. 8 is a graphic diagram of a phase pattern and reflected EM waves resulting from the formation and placement of a plurality of metasurface unit cell subsections 864-1 through 864-14 and metasurface unit cell absorber sections 877 similar to those shown in FIG. 7 according to an embodiment of the present disclosure. FIG. 8 also shows a plurality of access points 844-1, 844-2 that transmit EM waves as one or more frequencies towards the metasurface unit cell array 862.

In the example embodiment of FIG. 8, 14 individual metasurface unit cell subsections 864-1 through 864-14 are shown with a top row of metasurface unit cell subsections 864-1, 864-2, 864-3, 864-4, 864-5, 864-6, 864-7 and a bottom row of metasurface unit cell subsections 864-8, 864-9, 864-10, 864-11, 864-12, 864-13, 864-14, 864-15 separated by a plurality of metasurface unit cell absorber sections 877. Any number of metasurface unit cell subsections are contemplated in various embodiments of the present disclosure. Again, the metasurface unit cell absorber sections 877 may be used to absorb those second- and third-order harmonics of the EM waves that arise as EM waves are being reflected off of the surface of the each of the metasurface unit cell subsections 864-1 through 864-14 according to embodiments herein. For example, plural metasurface unit cell absorber sections 877 may be adjacent to one or more reflective metasurface unit cell subsections 864-1 through 864-14 to absorb or reduce through formation of destructive interference second- and third-order harmonics created by those reflective metasurface unit cell subsections 864-1 through 864-14 to mitigate interference and intermodulation across those reflective metasurface unit cell subsections 864-1 through 864-14.

Again, the individual metasurface unit cell subsections 864-1 through 864-14 may redirect EM waves at various directions from off of the surface of the metasurface unit cell array 862. In an embodiment, the top row of metasurface unit cell subsections 864-1, 864-2, 864-3, 864-4, 864-5, 864-6, 864-7 may reflect those EM waves in a plurality of directions across a horizontal azimuth and in any vertical direction. For example, the top row of metasurface unit cell subsections 864-1, 864-2, 864-3, 864-4, 864-5, 864-6, 864-7 generally reflecting those incident EM waves across plural horizontal directions and in an upward vertical direction. Any combination of horizontal or vertical redirection options are contemplated in various embodiments herein. In a further embodiment, the bottom row of metasurface unit cell subsections 864-8, 864-9, 864-10, 864-11, 864-12, 864-13, 864-14, 864-15 may reflect incident EM waves in a plurality of horizontal directions across a horizontal azimuth and in any vertical direction. In an example embodiment, the bottom row of metasurface unit cell subsections 864-8, 864-9, 864-10, 864-11, 864-12, 864-13, 864-14, 864-15 generally reflecting those incident EM waves across a plurality of horizontal directions and in a downward direction. Again, any combination of horizontal or vertical redirection options are contemplated in various embodiments herein. The metasurface unit cell array 862 may, therefore, offer the multiple fixed metasurface unit cell subsections 864-1 through 864-14 to reflect EM waves into multiple directions covering, for example, a 180° range across a horizontal azimuth and various vertically directed lobes to enhance gain and directionality coverage of radiofrequency signals of the EM waves from APs 844-1 and 844-2. Further, with such a plurality of slices of redirected EM waves reflected by the multiple fixed metasurface unit cell subsections 864-1 through 864-14 on a metasurface unit cell array 862, generated second- and third-order harmonics of the EM waves are absorbed and otherwise mitigated with placement of the metasurface unit cell absorber sections 877 in and amongst the multiple fixed metasurface unit cell subsections 864-1 through 864-14 of the metasurface unit cell array 862 according to embodiments herein.

Figure 9:
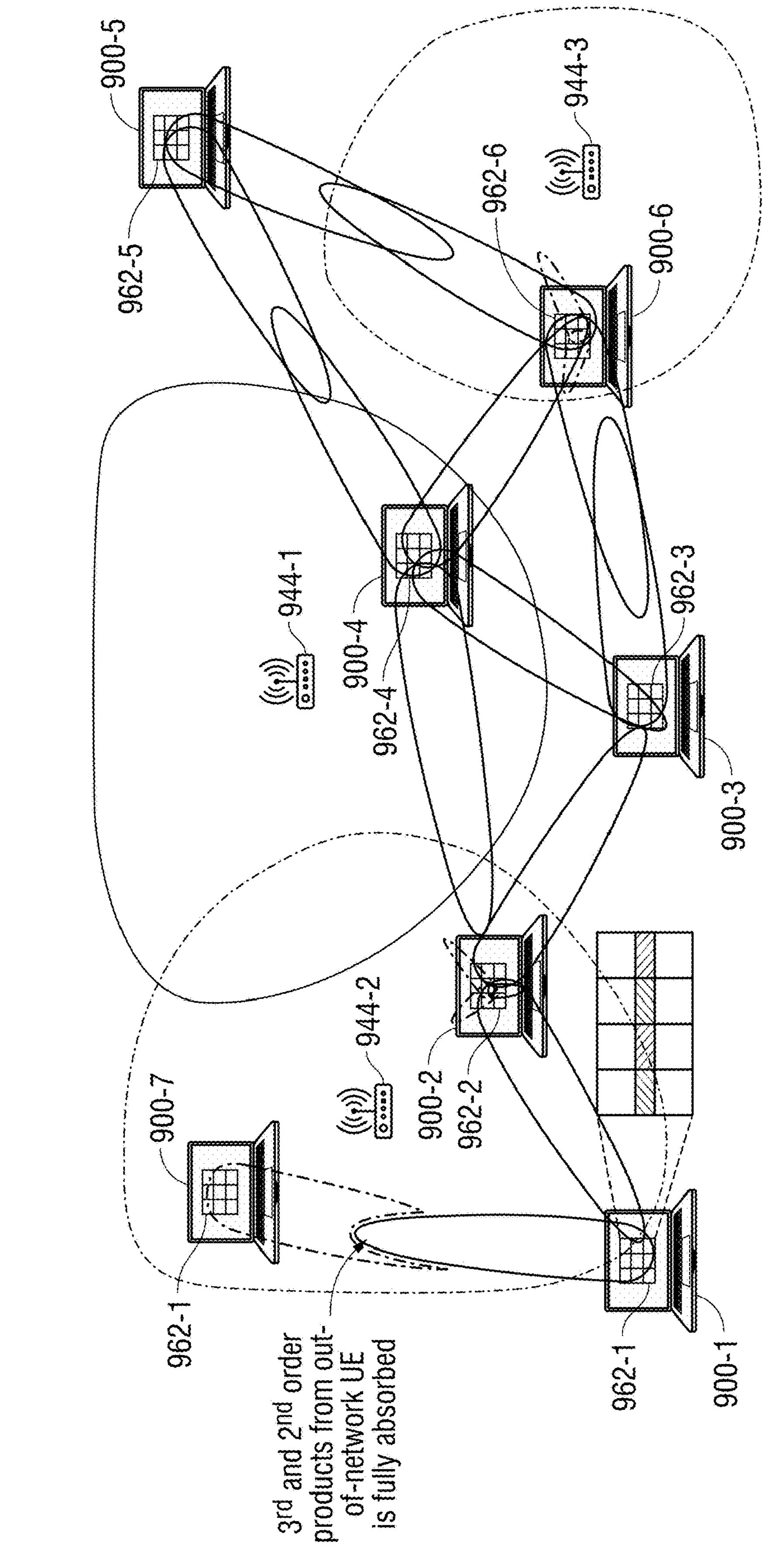
FIG. 9 is a graphic diagram illustrating an increase in EM wave coverage and mitigation of second- and third-order harmonics in a radiofrequency environment via use of a plurality of information handling systems and associated metasurface unit cell arrays coupled to some of the plurality of information handling systems according to an embodiment of the present disclosure.

FIG. 9 is a graphic diagram illustrating an increase in EM wave coverage in a radiofrequency environment via use of a plurality of information handling systems 900-1, 900-2, 900-3, 900-4, 900-5, 900-6, 900-7 and associated metasurface unit cell arrays 962-1, 962-2, 962-3, 962-4, 962-5, 962-6, 962-7 with mitigation of second- and third-order harmonics coupled to some of the plurality of information handling systems 900-1, 900-2, 900-3, 900-4, 900-5, 900-6, 900-7 according to an embodiment of the present disclosure. In an embodiment, a plurality of access points 944-1, 944-2, 944-3 is shown to emit respective wireless communications throughout a radiofrequency environment in which the plurality of information handling systems 900-1, 900-2, 900-3, 900-4, 900-5, 900-6, 900-7 are located. However, not all of the information handling systems 900-1, 900-2, 900-3, 900-4, 900-5, 900-6, 900-7 are within an acceptable wireless range from one or more of the access points 944-1, 944-2, 944-3 for wireless radiofrequency communications. Additionally, not all of the information handling systems 900-1, 900-2, 900-3, 900-4, 900-5, 900-6, 900-7 may be wirelessly coupled to all of the access points 944-1, 944-2, 944-3, some of which may be operated by different entities. As described herein, the metasurface unit cell arrays 962-1, 962-2, 962-3, 962-4, 962-5, 962-6, 962-7 may be used to provide sliced redirection of incident EM waves for radiofrequency communications to increase the wireless range of any given access point 944-1, 944-2, 944-3 in the radiofrequency environment. This is done by the metasurface unit cell arrays 962-1, 962-2, 962-3, 962-4, 962-5, 962-6, 962-7 redirecting and enhancing, through increased gain, those wireless signals emitted from a respective access points 944-1, 944-2, 944-3 in a plurality of directional lobes or slices to expand the coverage in the radiofrequency environment in embodiments herein. In a further embodiment, each of the metasurface unit cell arrays 962-1, 962-2, 962-3, 962-4, 962-5, 962-6, 962-7 includes absorptive unit cell subsections that prevent second- and third-order harmonics from causing interference or intermodulation between reflective metasurface unit cell subsections that provide for those plural sliced lobes of directionality being redirected by the metasurface unit cell arrays 962-1, 962-2, 962-3, 962-4, 962-5, 962-6, 962-7 within the radiofrequency environment.

FIG. 9 shows a first information handling system 900-1 that has a first metasurface unit cell array 962-1 to the lid of the first information handling system 900-1. As described herein, the first metasurface unit cell array 962-1 may redirect the incoming EM waves that form the wireless signal originating from a first access point 944-1 in a plurality of different lobe directions or slices as described herein at, for example, FIG. 8. This redirection of the EM waves increases the gain of the plurality of beams in those lobes or directions, thereby increasing the distance from the first access point 944-1 that the wireless signal may reach within the radiofrequency environment. Indeed, one of the redirected beams from the first access point 944-1 may be relayed from one or more of the second information handling system 900-2, a third information handling system 900-3, and/or a fourth information handling system 900-4 to reach the first information handling system 900-1. This allows the first information handling system 900-1 to receive a better wireless signal than would otherwise be realized without the use of the second metasurface unit cell array 962-2, the third metasurface unit cell array 962-3 and/or fourth metasurface unit cell array 962-4 operatively coupled to the lids of their respective information handling systems 900-2, 900-3, 900-4.

However, during operation, additional wireless networks may be created via operation of a second access point 944-2 or a third access point 944-3 transmitting radiofrequency signals within the radiofrequency environment. It is appreciated that each of the second access point 944-2 and third access point 944-3 may transmit EM waves (e.g., 2.4 GHz and 5 GHz frequency bands) that have the same frequencies or similar frequencies (e.g., channel dependent) as those emitted by the first access point 944-1, for example, within the 2.4 GHz and 5 GHz frequency bands. In some embodiments, the creation of the second- and third-order harmonics at the second access point 944-2 and third access point 944-3 when transmitting, wireless interference may occur at the second metasurface unit cell array 962-2, the third metasurface unit cell array 962-3 and/or fourth metasurface unit cell array 962-4 operatively coupled to the lids of their respective information handling systems 900-2, 900-3, 900-4 for the radiofrequency signal transmitted by access point 944-1 to the first information handling system 900-1, the second information handling system 900-2, or any other information handling system in the radiofrequency environment. Those of the second metasurface unit cell array 962-2, the third metasurface unit cell array 962-3 and/or fourth metasurface unit cell array 962-4 operatively coupled to the lids of their respective information handling systems 900-2, 900-3, 900-4 that are within wireless range of the second access point 944-2 and/or third access point 944-3 may be subject to those second- and third-order harmonics that cause interference or intermodulation with the radiofrequency signal EM waves transmitted by the first access point 900-1 even if those other access points 900-2 and 900-3 are operating at a nearby channel. As a consequence, these harmonics can overlap with other wireless channels from the radiofrequency signal being transmitted by access point 900-1 and relayed by these metasurface unit cell arrays 962-2, 962-3, and/or 962-4 leading to signal degradation. The second order harmonics metasurface unit cell absorber subsections and third order harmonics metasurface unit cell absorber subsections of each of the metasurface unit cell arrays 962-1, 962-2, 962-3, 962-4, 962-5, 962-6, 962-7 may mitigate the effects of these second- and third-order harmonics by absorbing them for the system of access points 900-2 and 900-3 so that a cleaner beamformed signal may be redirected off of the surface of each available metasurface unit cell array 962-1, 962-2, 962-3, 962-4, 962-5, 962-6, 962-7 from incident signals from access point 900-1 in an embodiment. In other embodiments, the second order harmonics metasurface unit cell absorber subsections and third order harmonics metasurface unit cell absorber subsections of each of the metasurface unit cell arrays 962-1, 962-2, 962-3, 962-4, 962-5, 962-6, 962-7 may mitigate the effects of these second- and third-order harmonics generated even by redirecting the EM waves of access point 900-1 by absorbing them as between adjacent reflecting metasurface unit cell subsections so that a cleaner beamformed signal may be redirected in plural slices or directions off of the surface of each available metasurface unit cell array 962-1, 962-2, 962-3, 962-4, 962-5, 962-6, 962-7 according to other embodiments of the present disclosure.

Similar situations occur with the third information handling system 800-3 and the fifth information handling system 800-5 shown in FIG. 8. Indeed, because the third information handling system 800-3 and fifth information handling system 800-5 each include a third metasurface unit cell array 862-3 and a fifth metasurface unit cell array 862-5, respectively, the wireless signal from the access point 844 may be relayed thereby increasing the wireless range of the access point 844 within the radiofrequency environment. This allows each of the metasurface unit cell arrays 962-1, 962-2, 962-3, 962-4, 962-5, 962-6, 962-7 associated with each of the information handling systems 900-1, 900-2, 900-3, 900-4, 900-5, 900-6, 900-7 to operate to not only extend the distance of the wireless network created by each of the individual first access point 944-1, second access point 944-2, and third access point 944-3, but also prevents those second- and third-order harmonics present within each wireless signal reflected in reflecting metasurface unit cell subsections from interfering with radio frequency signals transmitted from the first access point 944-1, the second access point 944-2, or the third access point 944-3. In this way, the metasurface unit cell arrays 962-1, 962-2, 962-3, 962-4, 962-5, 962-6, 962-7 associated with each of the information handling systems 900-1, 900-2, 900-3, 900-4, 900-5, 900-6, 900-7 may be formed with absorbing metasurface unit cell subsections to prevent interference from other wireless signal transmitted from other access points within the radiofrequency environment in embodiments herein. Even further, because the metasurface unit cell arrays 962-1, 962-2, 962-3, 962-4, 962-5, 962-6, 962-7 may each be capable of concurrently redirecting two frequencies using the unit cells shown and described in FIGS. 5 and 6, the metasurface unit cell arrays 962-1, 962-2, 962-3, 962-4, 962-5, 962-6, 962-7 may increase the distance of those wireless signals emitted by a dual-band first access point 944-1, second access point 944-2, and third access point 944-3 and reduce the second- and third-order harmonics interference amongst plural slices or directions of reflection from those metasurface unit cell arrays 962-1, 962-2, 962-3, 962-4, 962-5, 962-6, 962-7 of the wireless signals.

Thus, the presently-described metasurface unit cell array of embodiments herein provides directional signal enhancement by precisely redirecting enhanced EM waves without the need for electronic components or complex software algorithms. Still further, the static metasurface unit cell array may be a low-cost and maintenance free solution that makes the static metasurface unit cell array ideal for widespread deployment. This static metasurface unit cell array may be easily integrated into existing laptop designs without significant cost or complexity thereby providing a long-term enhancement to wireless connectivity without the need for updates or active management. Still further, the static metasurface unit cell array offers enhanced coexistence with passive collaboration among the information handling systems so that signal strength is enhanced and network reliability for each information handling system can leverage the presence of multiple laptops in order to enhance the network coverage.

Figure 10:
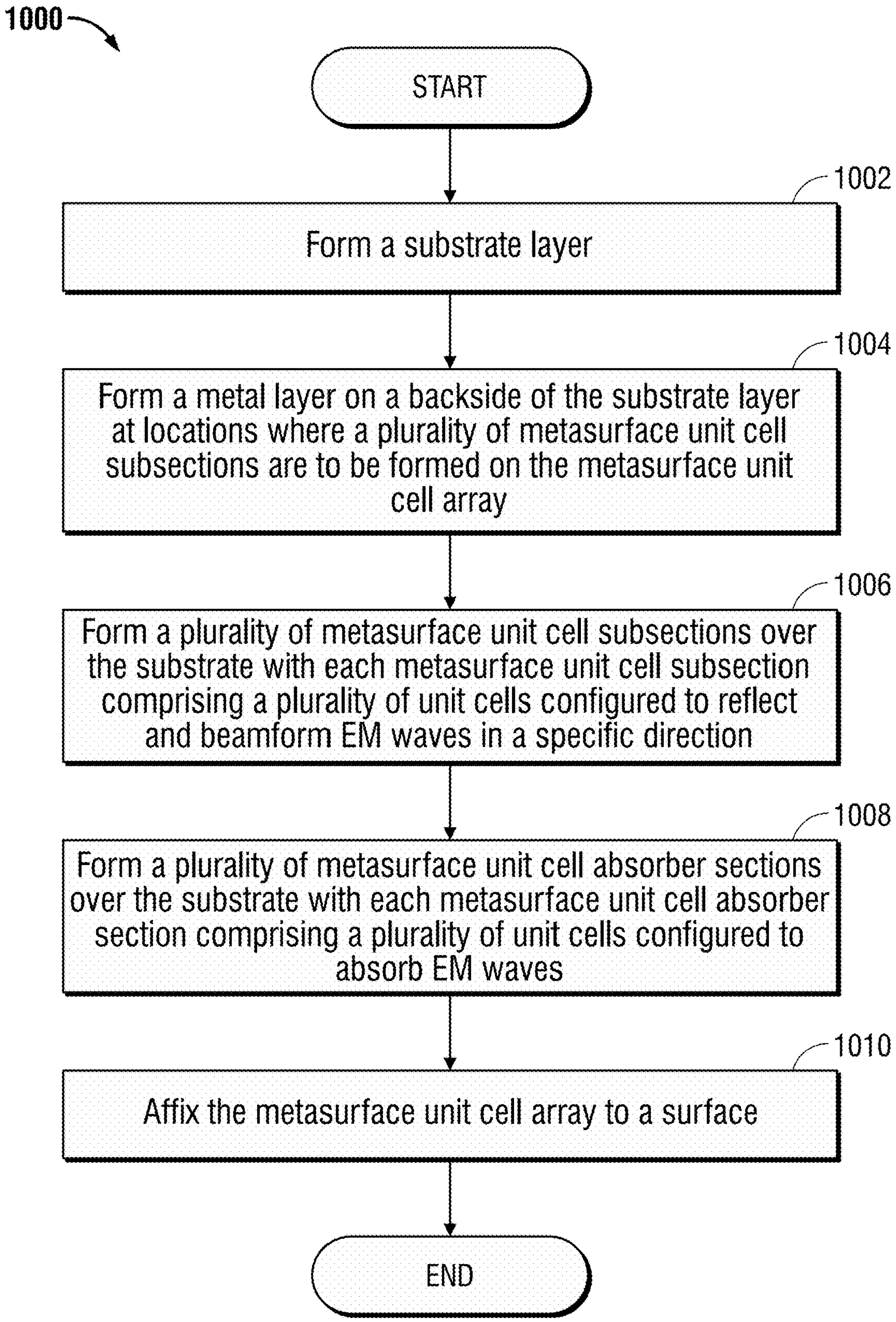
FIG. 10 is a flow diagram of a method of manufacturing a metasurface unit cell array with individual subsection slices including harmonics metasurface unit cell absorber subsections according to an embodiment of the present disclosure.

FIG. 10 is a flow diagram of a method 1000 of manufacturing a metasurface unit cell array with individual subsection slices with harmonics metasurface unit cell absorber subsections according to an embodiment of the present disclosure. As described herein, the metasurface may be a static metasurface unit cell array that does not require power to operate.

Thus, at block 1002, the method 1000 may include forming a substrate layer of the metasurface unit cell array. In an embodiment, this substrate layer may be made of a dielectric material such as fused silica, silicon, silicon dioxide, and other high-performance low-loss dielectrics such as Rogers RO400 series dielectrics.

At block 1004, the method 1000 includes forming a metal layer on a backside of the substrate layer at locations where a plurality of metasurface unit cell subsections are to be formed on the metasurface unit cell array. In an embodiment, this metal layer may be made of copper or other conductive metal. As described herein, the metasurface unit cell absorber sections may not have this metal layer so that the second- and third harmonics of the reflected EM waves may be absorbed. However, the metal layer may be placed behind each of those portions of the metasurface unit cell array where the metasurface unit cell subsections for EM signal reflections are to be formed.

At block 1006, the method 1000 includes forming a plurality of metasurface unit cell subsections over the substrate with each metasurface unit cell subsection comprising a plurality of unit cells configured in dimension and arrangement to reflect and beamform EM waves in a specific direction via constructive or destructive interference of the reflected EM waves across each metasurface unit cell subsection. In an embodiment, this may include selecting an appropriate design of each individual metasurface unit cells within each of the metasurface unit cell subsections such that a specific phase shifting pattern may be achieved within each of the metasurface unit cell subsections. For example, the individual unit cells may be selected from unit cells such as those described in connection with, for example, FIGS. 3A-3D and arranged within each metasurface unit cell subsection to form phase shift patterns for directionality of reflections for that particular metasurface unit cell subsection. Indeed, the selection of the design of neighboring metasurface unit cells arranged within each metasurface unit cell subsection may be dependent on the intended direction of a beam reflected from the surface of the metasurface unit cell array by that metasurface unit cell subsection as described in connection with, for example, FIGS. 7 and 8. In one embodiment, the metasurface unit cells of the static metasurface unit cell array may each include a plurality of concentric metal resonators formed around a central metal dot or node with the arrangement and number of concentric metal resonators defining the phase shifting of the incoming EM signals at each unit cell. In other embodiments, the metasurface unit cells of the static metasurface unit cell array may each include a plurality squares, circles, or other geometric shapes of conductive material with varying dimensions of those geometric shapes as resonators defining the phase shifting of the incoming EM signals at each unit cell. The arrangement of plural of these unit cells within each metasurface unit cell subsection generates phase shift patterns to redirect the EM signals in a first direction, a second direction, a third direction, a fourth direction or other directions having horizontal or vertical direction components in embodiments herein.

In an embodiment, the arrangement of the metasurface unit cell subsections may include placing each of the metasurface unit cell subsections next to each other a specific distance apart to form a completed metasurface unit cell array. As described in one embodiment herein, a distance between adjacent the subsections of neighboring metasurface unit cell subsections may be created such that this distance is at least a width of one or two metasurface unit cells to mitigate against interference. In other embodiments herein, a metasurface unit cell absorber section may be formed between adjacent subsections of neighboring metasurface unit cell subsections such that this metasurface unit cell absorber section mitigates against harmonic interference and intermodulation between adjacent subsections of neighboring metasurface unit cell subsections according to embodiments herein.

Thus, at block 1008, the method may also include forming a plurality of metasurface unit cell absorber sections over the substrate (e.g., where the metal layer is not present) with each metasurface unit cell absorber section comprising a plurality of unit cells configured to absorb EM waves. These metasurface unit cell absorber sections may be formed over the substrate between adjacent subsections of neighboring metasurface unit cell subsections in embodiments herein. Again, because the reflection of the EM waves off of the metasurface unit cell subsections creates those second- and third-order harmonic frequencies, the metasurface unit cell absorber sections may be tuned, via selection of unit cell designs, to absorb those specific harmonic frequencies including second- and third order harmonic frequencies anticipated as being reflected by radiofrequency signals of particular wireless protocols being used within the radiofrequency environment.

Once the metasurface unit cell array is manufactured, the metasurface unit cell array may be affixed to a surface at block 1010 in an embodiment. In other embodiments, the metasurface unit cell array with metasurface unit cell absorber sections may be formed into or onto the surface of the information handling system at block 1010 in other embodiments. As described herein, a display chassis lid of an information handling system may be an optimal location for placement of the metasurface unit cell array such that redirected EM waves may be reflected away from the information handling system in plural directions in the radiofrequency environment and used by other devices within a wireless network. The static metasurface unit cell array with metasurface unit cell absorber sections may be affixed with adhesive, snap fit into, embedded into, affixed with fasteners, or otherwise operatively coupled to or embedded into a surface of the information handling system according to embodiments herein. At this point, the method 900 may end.

The processes or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system comprising:

a processor, memory, power source, and a chassis having at least one external surface;

a static metasurface unit cell array operatively coupled to the at least one external surface of the information handling system comprising:

a first subsection of metasurface unit cells and a second subsection of metasurface unit cells of the static metasurface unit cell array to redirect incoming electromagnetic (EM) signals in a plurality of directional lobes, where each of the first subsection of metasurface unit cells and the second subsection of metasurface unit cells reflects EM signals in a different directional lobe;

a plurality of second order harmonics metasurface unit cell absorber subsections having a first plurality of absorber metasurface unit cells formed between the first subsection of metasurface unit cells and the second subsection of metasurface unit cells of the static metasurface unit cell array to absorb second order harmonic EM signals resulting from redirection of the incoming EM signals in the plurality of directional lobes; and a plurality of third order harmonics metasurface unit cell absorber subsections having a second plurality of absorber metasurface unit cells formed between the first subsection of metasurface unit cells and the second subsection of metasurface unit cells of the static metasurface unit cell array to absorb third order harmonic EM signals resulting from redirection of the incoming EM signals in the plurality of directional lobes.

2. The information handling system of claim 1 further comprising:

the first subsection of the metasurface unit cells included within a first grouped plurality of subsections of metasurface unit cells to redirect the incoming EM signals and the second subsection of metasurface unit cells included within a second grouped plurality of subsections of metasurface unit cells; and the plurality of second order harmonics metasurface unit cell absorber subsections are formed between the first grouped plurality of subsections of metasurface unit cells and the second grouped plurality of subsections of metasurface unit cells of the static metasurface unit cell array, where the plurality of second order harmonics metasurface unit cell absorber subsections absorb second order harmonic EM signals resulting from redirection of the incoming EM signals in the plurality of directional lobes by the first grouped plurality of subsections of metasurface unit cells and the second grouped plurality of subsections of metasurface unit cells of the static metasurface unit cell array.

3. The information handling system of claim 1 further comprising:

a plurality of subsections of metasurface unit cells including the first subsection of metasurface unit cells and the second subsection of metasurface unit cells of the static metasurface unit cell array to redirect incoming EM signals in a plurality of directional lobes across a horizontal azimuth from a surface of the static metasurface unit cell array.

4. The information handling system of claim 1 further comprising:

a plurality of subsections of metasurface unit cells including the first subsection of metasurface unit cells and the second subsection of metasurface unit cells of the static metasurface unit cell array to redirect incoming EM signals in a plurality of directional lobes having different vertical directions from a surface of the static metasurface unit cell array.

5. The information handling system of claim 1 further comprising:

a plurality of subsections of metasurface unit cells including the first subsection of metasurface unit cells and the second subsection of metasurface unit cells of the static metasurface unit cell array to redirect incoming EM signals in a plurality of directional lobes having a plurality of horizontal and vertical directions from a surface of the static metasurface unit cell array.

6. The information handling system of claim 1 further comprising:

the metasurface unit cells of the static metasurface unit cell array each including a plurality of concentric metal resonators formed around a central metal node with an arrangement and number of concentric metal resonators defining phase shifting of the incoming EM signals by each metasurface unit cell;

the arrangement of the metasurface unit cells in the first subsection of metasurface unit cells redirects the EM signals in a first direction; and the arrangement of the metasurface unit cells in the second subsection of metasurface unit cells redirects the EM signals in a second direction.

7. The information handling system of claim 1, wherein each of the absorber metasurface unit cells of the first plurality of absorber metasurface unit cells includes metallic resonators formed to create destructive interference to reduce the second order harmonic EM signals resulting from redirection of the incoming EM signals in the plurality of directional lobes.

8. The information handling system of claim 1 further comprising:

the metasurface unit cells of the static metasurface unit cell array each including a set of square metal resonators including a plurality of first sized square metal resonators tuned to resonate at a first frequency of incoming EM signals and a plurality of second sized square metal resonators tuned to resonate at a second frequency of incoming EM signals.

9. A static metasurface unit cell array comprising:

a substrate layer with a resonating layer formed over the substrate layer including a plurality of resonating structures forming metasurface unit cells for a panel of the static metasurface unit cell array;

a first subsection of metasurface unit cells and a second subsection of metasurface unit cells of the static metasurface unit cell array to redirect incoming electromagnetic (EM) signals in a plurality of directional lobes, where each of the first subsection of metasurface unit cells and the second subsection of metasurface unit cells reflects EM signals in a different directional lobe;

a plurality of second order harmonics metasurface unit cell absorber subsections having a first plurality of absorber metasurface unit cells formed between the first subsection of metasurface unit cells and the second subsection of metasurface unit cells of the static metasurface unit cell array to absorb second order harmonic EM signals resulting from redirection of the incoming EM signals in the plurality of directional lobes; and a plurality of third order harmonics metasurface unit cell absorber subsections having a second plurality of absorber metasurface unit cells formed between the first subsection of metasurface unit cells and the second subsection of metasurface unit cells of the static metasurface unit cell array to absorb third order harmonic EM signals resulting from redirection of the incoming EM signals in the plurality of directional lobes.

10. The static metasurface unit cell array of claim 9 further comprising:

a bottom metal layer formed under the substrate layer under the first subsection of metasurface unit cells and the second subsection of metasurface unit cells of the static metasurface unit cell array to redirect the incoming EM signals in the plurality of directional lobes, wherein the bottom metal layer is not formed under the substrate layer under the plurality of second order harmonics metasurface unit cell absorber subsections and the plurality of third order harmonics metasurface unit cell absorber subsections.

11. The static metasurface unit cell array of claim 9 further comprising:

the first subsection of the metasurface unit cells included within a first grouped plurality of subsections of metasurface unit cells to redirect the incoming EM signals and the second subsection of metasurface unit cells included within a second grouped plurality of subsections of metasurface unit cells; and the plurality of second order harmonics metasurface unit cell absorber subsections are formed between the first grouped plurality of subsections of metasurface unit cells and the second grouped plurality of subsections of metasurface unit cells of the static metasurface unit cell array, where the plurality of second order harmonics metasurface unit cell absorber subsections absorb second order harmonic EM signals resulting from redirection of the incoming EM signals in the plurality of directional lobes by the first grouped plurality of subsections of metasurface unit cells and the second grouped plurality of subsections of metasurface unit cells of the static metasurface unit cell array.

12. The static metasurface unit cell array of claim 9 further comprising:

the metasurface unit cells of the static metasurface unit cell array each including a plurality of metal resonators sized and arranged to define phase shifting of the incoming EM signals by each metasurface unit cell;

the arrangement of the metasurface unit cells in the first subsection of metasurface unit cells redirects the EM signals in a first direction; and the arrangement of the metasurface unit cells in the second subsection of metasurface unit cells redirects the EM signals in a second direction.

13. The static metasurface unit cell array of claim 9, wherein each of the absorber metasurface unit cells of the first plurality of absorber metasurface unit cells includes metallic resonators formed to create destructive interference to reduce the second order harmonic EM signals resulting from redirection of the incoming EM signals in the plurality of directional lobes.

14. The static metasurface unit cell array of claim 9, wherein each of the absorber metasurface unit cells of the second plurality of absorber metasurface unit cells includes metallic resonators formed to create destructive interference to reduce the third order harmonic EM signals resulting from redirection of the incoming EM signals in the plurality of directional lobes.

15. An information handling system comprising:

a processor, memory, power source, and a chassis having at least one external surface;

a static metasurface unit cell array having a substrate layer with a resonating layer formed over the substrate layer including a plurality of resonating structures forming metasurface unit cells for a panel of the static metasurface unit cell array operatively coupled to the at least one external surface of the information handling system;

a first subsection of metasurface unit cells and a second subsection of metasurface unit cells of the static metasurface unit cell array to redirect incoming electromagnetic (EM) signals in a plurality of directional lobes, where each of the first subsection of metasurface unit cells and the second subsection of metasurface unit cells reflects EM signals in a different directional lobe;

a plurality of second order harmonics metasurface unit cell absorber subsections having a first plurality of absorber metasurface unit cells formed between the first subsection of metasurface unit cells and the second subsection of metasurface unit cells of the static metasurface unit cell array to absorb second order harmonic EM signals resulting from redirection of the incoming EM signals in the plurality of directional lobes; and a plurality of third order harmonics metasurface unit cell absorber subsections having a second plurality of absorber metasurface unit cells formed between the first subsection of metasurface unit cells and the second subsection of metasurface unit cells of the static metasurface unit cell array to absorb third order harmonic EM signals resulting from redirection of the incoming EM signals in the plurality of directional lobes.

16. The information handling system of claim 15 further comprising:

the first subsection of the metasurface unit cells included within a first grouped plurality of subsections of metasurface unit cells to redirect the incoming EM signals and the second subsection of metasurface unit cells included within a second grouped plurality of subsections of metasurface unit cells; and the plurality of second order harmonics metasurface unit cell absorber subsections are formed between the first grouped plurality of subsections of metasurface unit cells and the second grouped plurality of subsections of metasurface unit cells of the static metasurface unit cell array, where the plurality of second order harmonics metasurface unit cell absorber subsections absorb second order harmonic EM signals resulting from redirection of the incoming EM signals in the plurality of directional lobes by the first grouped plurality of subsections of metasurface unit cells and the second grouped plurality of subsections of metasurface unit cells of the static metasurface unit cell array.

17. The information handling system of claim 15 further comprising:

the metasurface unit cells of the static metasurface unit cell array each including the plurality of metal resonating structures formed in the resonating layer with an arrangement and number of metal resonators defining phase shifting of the incoming EM signals by each metasurface unit cell;

the arrangement of the metasurface unit cells in the first subsection of metasurface unit cells redirects the EM signals in a first direction; and the arrangement of the metasurface unit cells in the second subsection of metasurface unit cells redirects the EM signals in a second direction.

18. The information handling system of claim 15, wherein each of the absorber metasurface unit cells of the first plurality of absorber metasurface unit cells includes metallic resonating structures formed to create destructive interference to reduce the second order harmonic EM signals and resulting from redirection of the incoming EM signals in the plurality of directional lobes.

19. The information handling system of claim 15, wherein each of the absorber metasurface unit cells of the second plurality of absorber metasurface unit cells includes metallic resonating structures formed to create destructive interference to reduce the third order harmonic EM signals and resulting from redirection of the incoming EM signals in the plurality of directional lobes.

20. The information handling system of claim 15 further comprising:

a bottom metal layer formed under the substrate layer under the first subsection of metasurface unit cells and the second subsection of metasurface unit cells of the static metasurface unit cell array to redirect the incoming EM signals in the plurality of directional lobes, wherein the bottom metal layer is not formed under the substrate layer under the plurality of second order harmonics metasurface unit cell absorber subsections and the plurality of third order harmonics metasurface unit cell absorber subsections.

* * * * *